(12) United States Patent
Aalund et al.

(10) Patent No.: US 11,541,322 B1
(45) Date of Patent: Jan. 3, 2023

(54) MAT CONTROLLABLE BY REMOTE COMPUTING DEVICE

(71) Applicant: Amazon Technologies, Inc., Seattle, WA (US)

(72) Inventors: Martin Peter Aalund, Seattle, WA (US); Ana Sande do Vale Pinto da Silva, Seattle, WA (US); Jiayi Liang, Seattle, WA (US); Babak Amir Parviz, Seattle, WA (US); Kevin Charles Flick, Seattle, WA (US); James Merton Tidman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 589 days.

(21) Appl. No.: 15/804,934

(22) Filed: Nov. 6, 2017

(51) Int. Cl.
| | | |
|---|---|---|
| *A63H 33/04* | (2006.01) | |
| *G09B 5/06* | (2006.01) | |
| *A63H 33/26* | (2006.01) | |
| *G09B 19/22* | (2006.01) | |
| *A47D 15/00* | (2006.01) | |
| *A47C 31/00* | (2006.01) | |

(52) U.S. Cl.
CPC ......... *A63H 33/042* (2013.01); *A47D 15/001* (2013.01); *A63H 33/046* (2013.01); *A63H 33/26* (2013.01); *G09B 5/062* (2013.01); *G09B 5/067* (2013.01); *A47C 31/003* (2013.01); *G09B 19/22* (2013.01)

(58) Field of Classification Search
CPC .... A63H 33/042; A63H 33/046; A63H 33/26; A47D 15/001; G09B 5/062; G09B 5/067; G09B 19/22; A47C 31/003
See application file for complete search history.

(56) References Cited

U.S. PATENT DOCUMENTS

| | | | | |
|---|---|---|---|---|
| 4,993,985 A | * | 2/1991 | Bass | A63H 17/40 |
| | | | | 446/133 |
| 5,103,513 A | * | 4/1992 | King | A47C 7/14 |
| | | | | 5/118 |

(Continued)

OTHER PUBLICATIONS

Modular Robotics, retrieved Sep. 27, 2017 at www.modrobotics.com, 20 pgs.

(Continued)

*Primary Examiner* — Xuan M Thai
*Assistant Examiner* — Sadaruz Zaman
(74) *Attorney, Agent, or Firm* — Lee & Hayes, P.C.

(57) ABSTRACT

A smart block can include a plurality of displays and configurable magnet components to selectively attract or repel other smart blocks. The smart block can include proximity sensors to identify a surface of another smart block close to the smart block to determine if the smart blocks are correctly oriented based on an application or game associated with the operation of the smart blocks. A plurality of smart blocks can be configured to display a portion of a picture (as a puzzle), such that when the smart blocks are oriented correctly they collectively display the complete picture. The smart blocks can be used in conjunction with a smart mat that is configured to move the smart blocks in response to commands received from a remote computing device. The smart blocks and the smart mat can facilitate interactivity with other, remote users, such as between a caregiver and a child.

20 Claims, 20 Drawing Sheets

(56) References Cited

U.S. PATENT DOCUMENTS

| | | | |
|---|---|---|---|
| 8,353,737 B2* | 1/2013 | Sofman | A63H 17/32 446/456 |
| 8,782,934 B2* | 7/2014 | Pearce | A47F 3/00 40/406 |
| 9,795,894 B2* | 10/2017 | Chieffo | A63H 33/26 |
| 2003/0124954 A1 | 7/2003 | Liu | |
| 2005/0075037 A1* | 4/2005 | Whitehead | A63H 33/26 446/129 |
| 2006/0154726 A1* | 7/2006 | Weston | A63F 13/12 463/36 |
| 2007/0023244 A1* | 2/2007 | Carlson | B62D 5/006 188/267 |
| 2009/0066452 A1* | 3/2009 | Hsu | A47C 27/065 335/306 |
| 2009/0288283 A1* | 11/2009 | Fullerton | A63H 33/046 446/92 |
| 2010/0001923 A1* | 1/2010 | Zilber | A63F 13/22 345/1.1 |
| 2010/0038850 A1 | 2/2010 | Tenorio | |
| 2010/0258646 A1* | 10/2010 | Tamulewicz | A63H 18/02 238/10 B |
| 2011/0066239 A1* | 3/2011 | Smoot | G09B 23/30 623/6.64 |
| 2011/0272884 A1* | 11/2011 | Kraegeloh | A63H 18/002 273/237 |
| 2012/0122059 A1* | 5/2012 | Schweikardt | G09B 23/00 434/118 |
| 2013/0343025 A1* | 12/2013 | Bdeir | A63H 33/26 361/803 |
| 2014/0273730 A1* | 9/2014 | Brandwijk | B25J 9/08 446/484 |
| 2014/0274417 A1* | 9/2014 | Brandwijk | A63F 13/00 463/43 |
| 2014/0342834 A1* | 11/2014 | Tappeiner | A63H 30/02 463/42 |
| 2015/0044938 A1* | 2/2015 | Chieffo | A63H 1/00 446/256 |
| 2015/0224941 A1* | 8/2015 | Bernstein | G05D 1/0022 180/167 |
| 2015/0258459 A1* | 9/2015 | Scott | A63F 13/00 463/43 |
| 2016/0088958 A1* | 3/2016 | Cignarella | G06F 1/3262 446/73 |
| 2016/0089614 A1* | 3/2016 | Cochella | A63H 33/102 446/111 |
| 2016/0184993 A1* | 6/2016 | Brandwijk | A63H 33/04 700/258 |
| 2016/0228073 A1* | 8/2016 | Pruyne | A61B 6/04 |
| 2016/0346671 A1* | 12/2016 | Jarchafjian | H04W 4/80 |
| 2017/0021284 A1* | 1/2017 | Murison | A63H 11/00 |
| 2017/0144083 A1* | 5/2017 | Kaersgaard et al. | A63H 33/086 |
| 2017/0173486 A1* | 6/2017 | Rothschild | A63H 33/042 |
| 2017/0316714 A1* | 11/2017 | Lau | G09B 19/0053 |
| 2018/0123291 A1* | 5/2018 | Brandwijk, Brandwijk | A63H 33/042 |
| 2018/0229142 A1* | 8/2018 | Brandwijk | A63H 33/042 |
| 2020/0051460 A1* | 2/2020 | Bedor | G09B 5/065 |
| 2020/0294407 A1* | 9/2020 | Tillman, Sr. | G09B 1/16 |
| 2020/0391134 A1* | 12/2020 | Hansen | A63H 33/26 |
| 2021/0204721 A1* | 7/2021 | Srikanchana | F16B 1/00 |

OTHER PUBLICATIONS

Pla et al., "Display Blocks: a Set of Cubic Displays for Tangible, Multi-Perspective Data Exploration", Proceedings 7th Intl Conf on Tangible, Embedded and Embodied Interaction, TEI 2013, Feb. 2013, 8 pgs.

Office Action for U.S. Appl. No. 15/804,862, dated Apr. 6, 2020, Aalund, "Configurable Devices", 26 Pages.

Office Action for U.S. Appl. No. 15/804,862, dated Jun. 21, 2021, Aalund, "Configurable Devices" 30 pages.

Office Action for U.S. Appl. No. 15/804,862, dated Dec. 22, 2021, Aalund, "Configurable Devices", 30 pages.

Office Action for U.S. Appl. No. 15/804,862, dated Apr. 27, 2022, Aalund, "Configurable Devices", 22 pages.

* cited by examiner

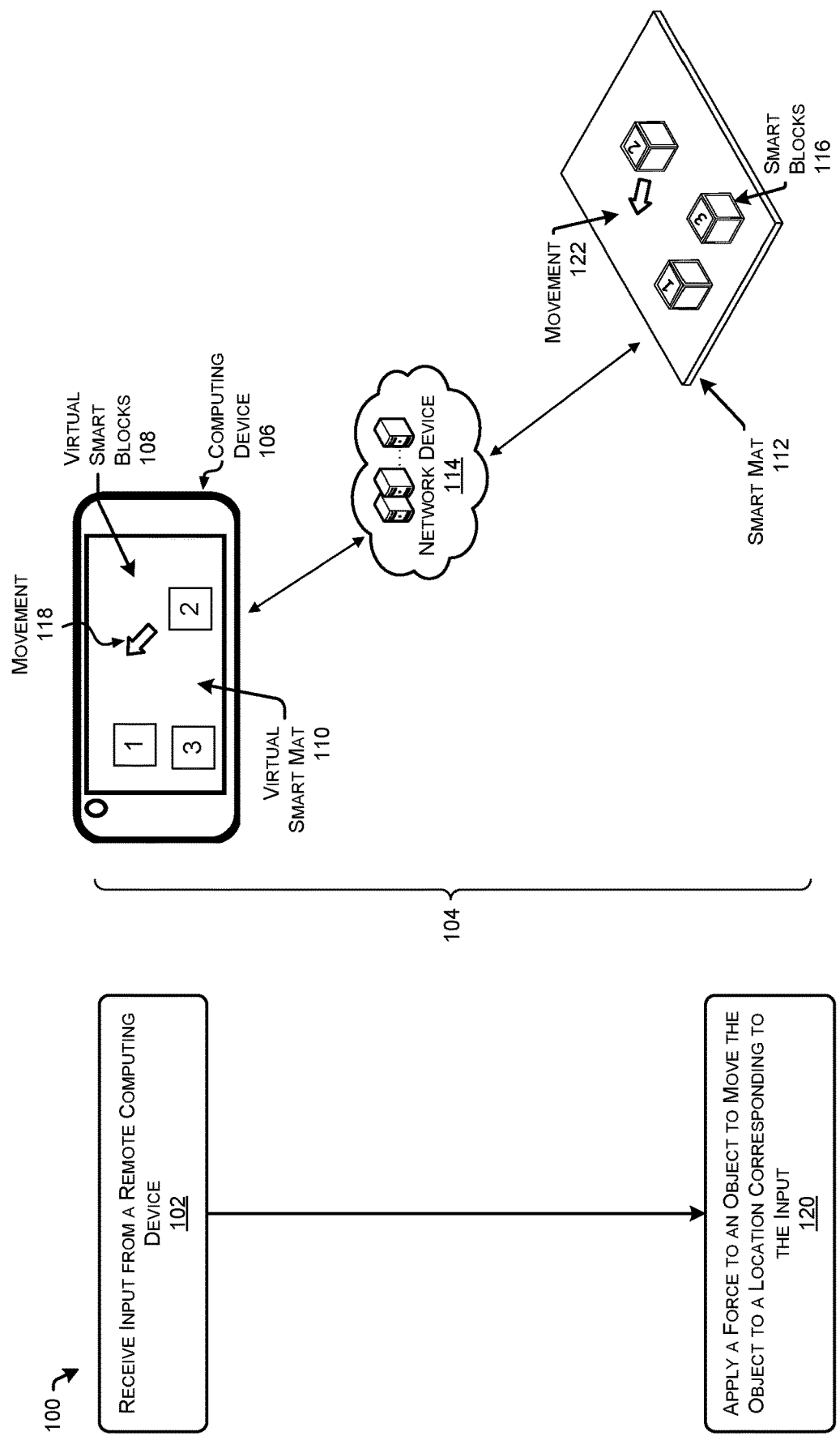

1400 ⟶

```
┌─────────────────────────────────────────────────────────────────────┐
│ RECEIVE AN INDICATION OF A REMOTE INTERACTION ASSOCIATED WITH A SURFACE OF A REMOTE │
│                         COMPUTING DEVICE                            │
│                              1402                                    │
└─────────────────────────────────────────────────────────────────────┘
                                   │
                                   ▼
┌─────────────────────────────────────────────────────────────────────┐
│           DETERMINE AN ACTION ASSOCIATED WITH THE INDICATION         │
│                              1404                                    │
└─────────────────────────────────────────────────────────────────────┘
                                   │
                                   ▼
┌─────────────────────────────────────────────────────────────────────┐
│  PROVIDE AN OUTPUT (E.G., AUDIO, VISUAL, AND/OR HAPTIC) AT A LOCAL COMPUTING DEVICE │
│                 BASED AT LEAST IN PART ON THE INDICATION             │
│                              1406                                    │
└─────────────────────────────────────────────────────────────────────┘
                                   │
                                   ▼
┌─────────────────────────────────────────────────────────────────────┐
│  DETERMINE A LOCATION OF AT LEAST ONE OBJECT LOCATED ON THE LOCAL COMPUTING DEVICE  │
│                              1408                                    │
└─────────────────────────────────────────────────────────────────────┘
                                   │
                                   ▼
┌─────────────────────────────────────────────────────────────────────┐
│ DETERMINE THAT THE AT LEAST ONE OBJECT HAS COMPLETED THE ACTION ASSOCIATED WITH THE │
│                              INDICATION                              │
│                              1410                                    │
└─────────────────────────────────────────────────────────────────────┘
                                   │
                                   ▼
┌─────────────────────────────────────────────────────────────────────┐
│   TRANSMIT THE LOCATION ASSOCIATED WITH THE AT LEAST ONE OBJECT TO THE REMOTE       │
│                         COMPUTING DEVICE                            │
│                              1412                                    │
└─────────────────────────────────────────────────────────────────────┘
```

FIG. 14

MAT CONTROLLABLE BY REMOTE COMPUTING DEVICE

BACKGROUND

Toy blocks provide many physical, social, and creative benefits to children when engaged in play with such blocks. For example, toy blocks help build strength in a child's fingers and hands, and improve eye-hand coordination. Caregivers and children can use toy blocks to play together, encouraging interaction and imagination.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 1A is a pictorial flow diagram of a process for receiving input and applying a force to an object on a smart mat, in accordance with embodiments of the disclosure.

FIG. 14 illustrates an example flow diagram of a process for facilitating interactions between a remote computing device and a surface of a smart mat, in accordance with embodiments of the disclosure.

DETAILED DESCRIPTION

Figure 1B:
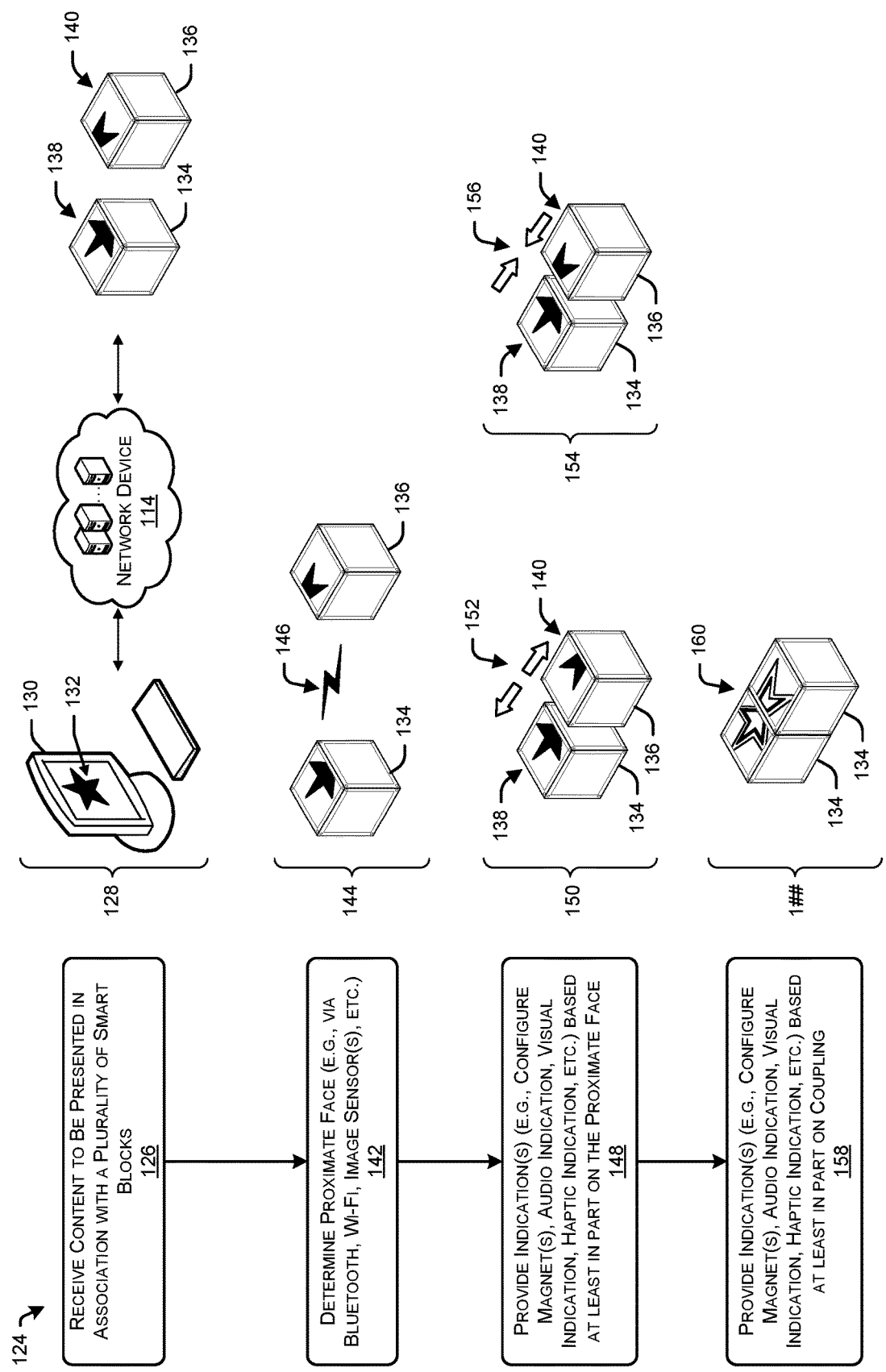
FIG. 1B is a pictorial flow diagram of a process for configuring and interacting with smart blocks, in accordance with embodiments of the disclosure.

This disclosure describes methods, apparatuses, and systems associated with connectable smart blocks with displays. Further, this disclosure describes methods, apparatuses, and systems associated with smart mats controllable by a remote computing device. In some instances, the smart blocks and smart mats can be used together to provide an immersive and interactive experience.

In general, the smart mat can include a variety of hardware configured to provide a variety of functions. For example, the smart mat can include a display to output indications, images, video, etc. that can be received from one or more remote devices. In some examples, the display of the smart mat can be implemented as a low-resolution display (e.g., including a grid of LEDs), a high-resolution display, an e-ink display, a fiber optic display, and the like. In some instances, the smart mat can be configured to receive content projected from one or more external projectors to display content. Further, the smart mat can include one or more speakers to provide indications, audio feedback, generate sound fields, etc. For example, the smart may can include speakers in the corners of the smart mat providing directional hints to locate and/or move objects on the smart mat. In some instances, the smart mat can include a configurable magnetic layer that can selectively generate magnetic fields that interact with corresponding objects placed on the smart mat to move objects from a first location to a second location. Additionally, in some instances, the smart mat can include haptic feedback components to provide haptic feedback and/or to move objects on the smart mat. Further, the smart mat can include an integrated cushioned layer to allow users to comfortably sit on the smart mat while interacting with the smart mat.

As noted above, the smart mat can be configured to receive input from one or more remote computing devices to output video, audio, haptic feedback, move objects, and the like, in accordance with embodiments of the disclosure. For example, a remote computing device can include a user interface including a representation of the smart mat and/or including representations of any objects located on a surface of the smart mat. In some instances, the remote computing device can receive input in the form of voice control or gestures. Further, an image capture device can capture image data representing objects on a corresponding smart mat. In another example, a first smart mat is located in a first environment and the remote computing device can be embodied as a second smart mat in a second environment. In such an example, a child can interact with one or more objects on the first smart mat, while a caregiver can interact with one or more corresponding objects on the second smart mat. In some cases, the caregiver can move or otherwise manipulate an object on the second smart mat, and the movement can be captured and transmitted to the first smart mat so that the movement can be applied to a corresponding object.

In some cases, the smart mat can include an embedded array of wires, coils, or other configurable magnetic components configured to apply an attractive force or repulsive force to push or pull objects on a surface of the smart mat. In some instances, the attractive and/or repulsive force(s) can be used to flip or roll objects on the surface of the smart mat. In some implementations, motion can be imparted using haptic feedback, acoustic waves (e.g., generating waves in the surface of the smart mat), robotically controlled magnets to move objects, and the like. In some instances, the smart mat and/or the objects on the smart mat can include pyrolytic carbon, for example, to levitate objects disposed above the smart mat.

A use case for interacting with the smart blocks and smart mat is discussed below in context of assembling a puzzle. In one example, a caregiver at a remote location can select an image to be decomposed into puzzle pieces and transmitted to a plurality of smart blocks for presentation thereon. In some instances, the plurality of smart blocks can be placed on a surface of the smart mat, which can monitor a location of the various smart blocks, provide visual, audio, and haptic indications, and cause movement of the smart blocks, as discussed herein. In one example, a child can be sitting on the smart mat and can be interacting with the smart mat and smart blocks to assemble the puzzle In a further example, the child may need assistance locating a piece of the puzzle or may need assistance assembling the puzzle. In such an example, the caregiver can select, via a remote user interface or via a smart mat (e.g., a remote smart mat) having objects thereon representing the corresponding configuration of the smart blocks on the smart mat in the location of the child, a smart block and/or a location on the smart mat where the smart block should be located. For example, the caregiver can touch an object and a location on the remote smart mat, causing a smart block corresponding to the object to light up (or provide some visual, audio, and/or haptic feedback), and further causing a location on the smart mat corresponding to the location on the remote smart mat to light up as well (or causing some visual, audio, and/or haptic feedback).

Continuing, in a case where the child does not move the smart block to the correct location on the smart mat, the caregiver can move the corresponding object on the remote smart mat (or the remote user interface), whereby the motion can be captured and converted to force on the smart mat associated with the child to move the corresponding smart block. In some instances, the configurable magnetic layer in the smart mat can be controlled to move the smart block (e.g., using controllable magnetic impulses) to move the smart block to a correct location. Thus, a movement of an object on a remote smart mat can be mirrored by movement of a corresponding smart block on the smart mat in the environment of the child, thereby facilitating interaction between the remote locations.

Turning to the smart block, in some instances, the smart blocks can be used with or without the smart mat, and/or can be used to further facilitate interactivity between remote devices. In some instances, the smart blocks can be used in conjunction with other blocks having some or all of the same functionality, as discussed herein.

In some instances, a smart block can include one or more displays on various sides of the smart block, whereby each display can be programmed to present content specific to each side. In some instances, one or more sides of the smart block include image sensor(s) to capture images and video, microphone(s) to capture audio, speaker(s) to present audio content, haptic feedback component(s) to provide haptic feedback, capacitive sensor(s) to receive input, and the like. Further, the smart block can include proximity sensors to identify a surface of another smart block that is proximate to the smart block to determine if an orientation of the smart blocks is appropriate based on an application or game associated with the operation of the smart blocks. As just one example, a plurality of smart blocks can be configured to display a portion of a picture (as a puzzle), such that when the smart blocks are oriented correctly they collectively display the complete picture. As discussed herein, the smart blocks can provide feedback regarding the orientation of smart blocks relative to one another to facilitate interactivity with the smart blocks and with other, remote users, such as between a caregiver and a child.

Sides or surfaces of the smart block can be configured to be attracted to, can remain neutral, or can be repelled by other surfaces of other smart blocks. In some instances, smart blocks can be connectable via configurable magnet components disposed in or under the surface of the smart block, whereby an orientation of a magnetic field can be controlled to attract or repel various objects. In the context of using smart blocks to complete a puzzle, individual smart blocks can remain neutral or can repel each other until a correct puzzle piece (e.g., implemented on a display of a first smart block) is oriented correctly proximate to another puzzle piece (e.g., implemented on a display of a second smart block). When the first smart block is oriented correctly relative to the second smart block, the configurable magnet components can be configured to attract the surfaces of the first smart block and the second smart block to indicate the correct orientation of the blocks. In a further example, upon correctly orienting a puzzle piece, a smart block can present an animation, audio, or other feedback to indicate the correct orientation.

The configurable magnet components can be controlled via electrical currents generating magnetic fields in magnetically permeable material. For example, a magnet can be movably mounted proximate to a magnetically permeable material, such as iron, whereby a magnetic field can be generated by applying a current to wires that are coiled around the magnetically permeable material. In a first instance, current can be applied in a first direction through the wires, causing a first magnetic field in a first direction through the magnetically permeable material, and orienting the movably mounted magnet in accordance with the first magnetic field generated by the current. In a second instance, a current can be applied in a second direction (e.g., opposite the first direction) through the wires, causing a second magnetic field in a second direction through the magnetically permeable material, and orienting the movably mounted magnet in accordance with the second magnetic field. Upon ceasing the current through the wiring in either direction, the movably mounted magnet can provide a magnetic field in accordance with the orientation of the magnet. Therefore, the configurable magnet component can maintain a direction of the magnetic field in the absence of current being applied.

In some instances, the configurable magnet components can be implemented with a single magnetically permeable material allowing control between two states of the movably mounted magnet. That is, applying current in a first direction can cause an orientation of the magnet to orient 180 degrees away relative to an orientation of the magnet upon applying current in a second direction. In another embodiment, the configurable magnet components can be implemented with two or more individual magnetically permeable materials with wires coiled about, providing additional states for the movably mounted magnet. As discussed herein, an implementation with two magnetically permeable materials with wires coiled about allows the movable magnet to be oriented in four states. In some cases, those four states can allow for the movably mounted magnet to be controlled to orientations separated by 90 degrees of rotation. Additional details of the configurable magnet components are discussed herein.

As noted above, the smart block can include proximity sensor(s) to determine which face (e.g., also referred to as a side or surface) of the smart block is proximate to a face of another smart block. In some instances, a smart block can wirelessly communicate with another smart block to exchange identity information (and accordingly, to determine whether the respective smart blocks are to be oriented together). Further, the smart blocks can use image sensors to determine a visual indicator of the face of the smart block oriented towards the instant smart block. In some instances, identity information can be exchanged via magnetic pulses generated by the configurable magnet components, for example, and detected using a magnetometer or Hall effect sensor. In some instances, each side or face of a smart block can be associated with a unique identifier. Further, in some instances, faces of the smart block can include RFID (radio frequency identification) transmitters and/or receivers to determine proximate faces of proximate smart blocks. Other implementations can include transmitting and receiving Wi-Fi signals, NFC (near field communication), displaying and reading one or two-dimensional barcodes, etc.

In some instances, the smart block can operate in conjunction with a smart mat to identify and/or locate smart blocks on the smart mat. For example, individual faces of a smart block can include a physical pattern such as bumps or divots to uniquely identify each face. In some instances, when a smart block is placed onto a smart mat, as discussed herein, the smart mat can detect the physical pattern to identify and/or locate a particular smart block on the smart mat. Further, as discussed herein, the smart mat can request identification information associated with smart blocks to identify and/or locate smart blocks on a surface of the smart mat. In other implementations, the smart mat can display unique location identifiers on the display of the smart mat, and the smart blocks can detect a location on the smart mat by capturing imaging data corresponding to the unique location identifiers. These and other implementations are discussed in more detail throughout the disclosure.

The smart block can include one or more displays. Such displays can be implemented as high-resolution displays, e-ink displays, tactile electronic displays (e.g., refreshable Braille displays), segment displays, LED (light-emitting diode) displays, LCDs (liquid crystal displays), laser displays, holographic displays, and the like. In some instances, the smart block can receive light projected from a projector to present content. In some instances, the smart block can include one display or a plurality of displays (e.g., on each face of the smart block).

The smart block can transmit and receive information from one or more remote computing devices, enabling interactivity between users. For example, a first user (e.g., a child) can interact or play with the smart blocks at a first location, while a second user (e.g., a caregiver) can monitor the movement of the smart blocks at a remote computing device. Further, the caregiver can interact with "virtual smart blocks" presented on the display of the remote computing device, for example, and such interactions can be transmitted to the smart blocks for presentation to the child. For example, continuing with the puzzle example mentioned above, if a child is assembling a puzzle presented on the smart blocks, the caregiver can touch a virtual smart block, thereby causing a corresponding indication on the corresponding physical smart block. For example, if the caregiver touches or selects the virtual smart block on the display of the remote computing device, the corresponding physical smart block can light up, animate the display, vibrate, present audio content, etc., to indicate the action of the caregiver. When the child moves a smart block to complete a portion of the puzzle, the corresponding virtual smart blocks can be updated to reflect the movement of the physical smart blocks. Further, the remote computing device and the smart blocks can enable video and audio to be exchanged, for example, as a video conference, to enable interactivity between the users.

The methods, apparatuses, and systems described herein can be implemented in a number of ways. Example implementations are provided below with reference to the following figures.

FIG. 1A is a pictorial flow diagram of a process 100 for receiving input and applying a force to an object on a smart mat, in accordance with embodiments of the disclosure.

At 102, the operation can include receiving input from a remote computing device. In an example 104, a computing device 106 is illustrated as displaying one or more virtual smart blocks 108 on a virtual smart mat 110. In some instances, the computing device 106 can be communicatively coupled with a smart mat 112 via a network device 114. In some instances, the locations of the virtual smart blocks 108 can correspond to the locations of smart blocks 116 on the smart mat 112. In some instances, a movement of the virtual smart blocks 108 can cause a corresponding movement on the smart blocks 116, and in some instances, an input with respect to the virtual smart mat 110 can be transmitted to the smart mat 112 and provided as an indication on the smart mat 112. Further, the movements and indications can be bidirectional, such that an interaction on one device can be mirrored on another device, and vice versa.

As noted above, the operation 102 can include receiving an input from the remote computing device. In some instances, the input can be received corresponding to a movement 118.

At 120, the operation can include applying a force to an object to move the object to a location corresponding to the input. For example, the smart mat 112 can receive a command (also referred to as data or an indication) corresponding to the movement 118 and can apply a force to the smart blocks 116 to cause a movement 122 of a smart block 116 on the smart mat 112. As discussed herein, the movement 122 can be provided by magnets, haptics, robotics, levitation, air, etc.

FIG. 1B is a pictorial flow diagram of a process 124 for configuring and interacting with smart blocks, in accordance with embodiments of the disclosure. In general, the process 124 illustrates an example of configuring and interacting with two smart blocks as puzzle pieces, as discussed herein. In some instances, the process 124 can be performed individually by a single smart block or collectively by a plurality of smart blocks.

At 126, the operation includes receiving content to be presented in association with a plurality of smart blocks. In an example 128, a remote computing device 130 is illustrated as presenting content 132 represented as a star. The remote computing device 130 can be coupled via a network device 114 to a plurality of smart blocks, illustrated as a first smart block 134 and a second smart block 136, whereby the smart blocks 134 and 136 can receive the content 132. In the example 128, the content 132 can be decomposed into a first portion 138 and a second portion 140 to be displayed on the first smart block 134 and the second smart block 136, respectively, such that when the first smart block 134 and the second smart block 136 are correctly position, they collectively present the content 132. Of course, the content 132 is merely an example, and the content 132, the number of smart blocks, and the arrangement of the content 132 on the smart blocks will vary depending on content and application and/or game associated with the content 132. For example, in some instances, the content 132 can include image content, video content, audio content, haptic content, and the like.

In some instances, and in general, the remote computing device 130 can select the content 132 (and/or application or game) to be presented via the smart blocks, and can transmit the content 132 to the network device 114. The network device 114 can process the content 132 to decompose the content 132 into portions to be displayed via the smart blocks 134 and 136. Further, based on the content 132 and/or based on a number of smart blocks to present the content 132, the network device 114 can determine how the smart blocks will operate in various configurations, such as when smart blocks are oriented correctly or incorrectly in accordance with the content to be presented, to be discussed herein. Additional details of the network device 114, for example, are provided below in connection with FIG. 8.

At 142, the operation includes determining a proximate face relative to a smart block, such as the smart block 134. As an initial matter, the operation 142 can include the smart block 134 determining that the smart block 136 is proximate to the smart block 134. Further, the operation 142 can include determining which face of the smart block 136 is proximate to which face of the smart block 134. The smart block 134 can use a variety of proximity sensors and/or techniques to determine identify a smart block and/or face associated with the smart block. For example, the smart block 134 can transmit and/or receive a wireless signal such as Bluetooth or Wi-Fi to exchange smart block identify information. Further, the wireless signal can enable the smart block 134 to determine which face of the smart block 136 that is closest to the smart block 134. Additional operations to determine a proximate face may include utilizing an image sensor in combination with identifiers corresponding to a face of a smart block (e.g., barcodes, steganographic information, image recognition, etc.); using magnetometers or Hall effect sensors to detect magnetic pulses output by various faces of a proximate smart block; capturing an audio signal and decoding the audio signal to determine a face of a proximate smart block; using directional antennas to transmit an identifier for a face of the smart block; and the like. In an example 144, the smart block 134 is illustrated as determining a proximate face of the smart block 136, as illustrated by the signal 146. As discussed herein, the signal 146 may represent identification information associated with the smart block 136 and/or associated with a specific face of the smart block 136.

In some instances, the operation 126 can include receiving a plurality of wireless signals, wherein each wireless signal is transmitted by an antenna associated with an individual face of a smart block. For example, the smart block 136 can be implemented as a cube with six sides, with a wireless signal to be transmitted that is associated with individual sides of the cube. In some instances, the smart block 136 can include an accelerometer to determine an orientation of the smart block 136 relative to a ground. That is, the smart block 136 can utilize the accelerometer to determine which face of the smart block 136 is facing up. Of course, other sensors can be used in combination with an accelerometer to determine the orientation of the smart block 136 (e.g., a light sensor on a face oriented towards the ground can be used to determine, in part that the particular surface is oriented down, and accordingly, the opposite surface is oriented upwards). Next, the faces of the smart block 136 perpendicular to the ground can be configured to transmit an identification signal uniquely identifying the face of the smart block 136. In some instances, each face of the smart block 134 can include a corresponding receiver to receive the signals transmitted by the smart block 136. Signals that are received by each individual face of the smart block 134 can be analyzed to determine an associated RSSI (received signal strength indication), and based at least in part on the individual RSSIs associated with the received signals, the smart block 134 can determine which face of the smart block 136 is proximate to a corresponding face of the smart block 134. Additional embodiments and details of determining a proximate face of corresponding smart blocks are discussed herein.

At 148, the operation can include providing one or more indications based at least in part on the proximate face. For example, indications can include, but are not limited to, one or more of magnetic configurations of the smart blocks 134 and 136, audio indications, visual indications, haptic indications, and the like. In an example 150, the smart block 134 and 136 are oriented together such that the respective portions 138 and 140 are not oriented correctly to recreate the content 132, as illustrated in the example 128. That is, in the context of putting a puzzle together, the smart blocks 134 and 136 do not "fit" together. Accordingly, the smart block 134 and/or 136 can provide one or more indications to indicate that the orientation is incorrect. In the example 150, configurable magnet components included in the smart blocks 134 and 136 are configured to repel each other, as illustrated by a repulsive force 152. In some instances, the indication that the smart blocks 134 and 136 are oriented incorrectly in the example 150 can include audio indications, visual indication, haptic indications, and the like.

In another example 154, the smart blocks 134 and 136 are oriented together such that the respective portions 138 and 140 are oriented correctly to recreate the content 132. Accordingly, the smart block 134 and/or 136 can provide one or more indications to indicate that the orientation is correct. In the example 154, configurable magnet components included in the smart blocks 134 and 136 are configured to attract one another, as illustrated by an attractive force 156. In some instances, the indication that the smart blocks 134 and 136 are oriented correctly in the example 154 can include audio indications, visual indication, haptic indications, and the like. In some instances, the indications in the example 154 can be initiated upon determining that the smart blocks 134 and 136 are within a first threshold distance of each other.

At 158, the operation can include providing one or more indications based at least in part on coupling. For example, at a time in which the smart blocks 134 and 136 touch (or a time in which the smart blocks 134 and 136 are within a second threshold distance of each other, the operation 158 can include providing an additional indication, such as configuring one or more magnets, an audio indication, a visual indication, or a haptic indication. In an example 160, upon coupling (e.g., touching in a correct orientation), the smart blocks 134 and 136 collectively are illustrated as animating content 140, which is associated with the portions of the content 138 and 140. Of course, other indications can be provided, as discussed herein.

Figure 2A:
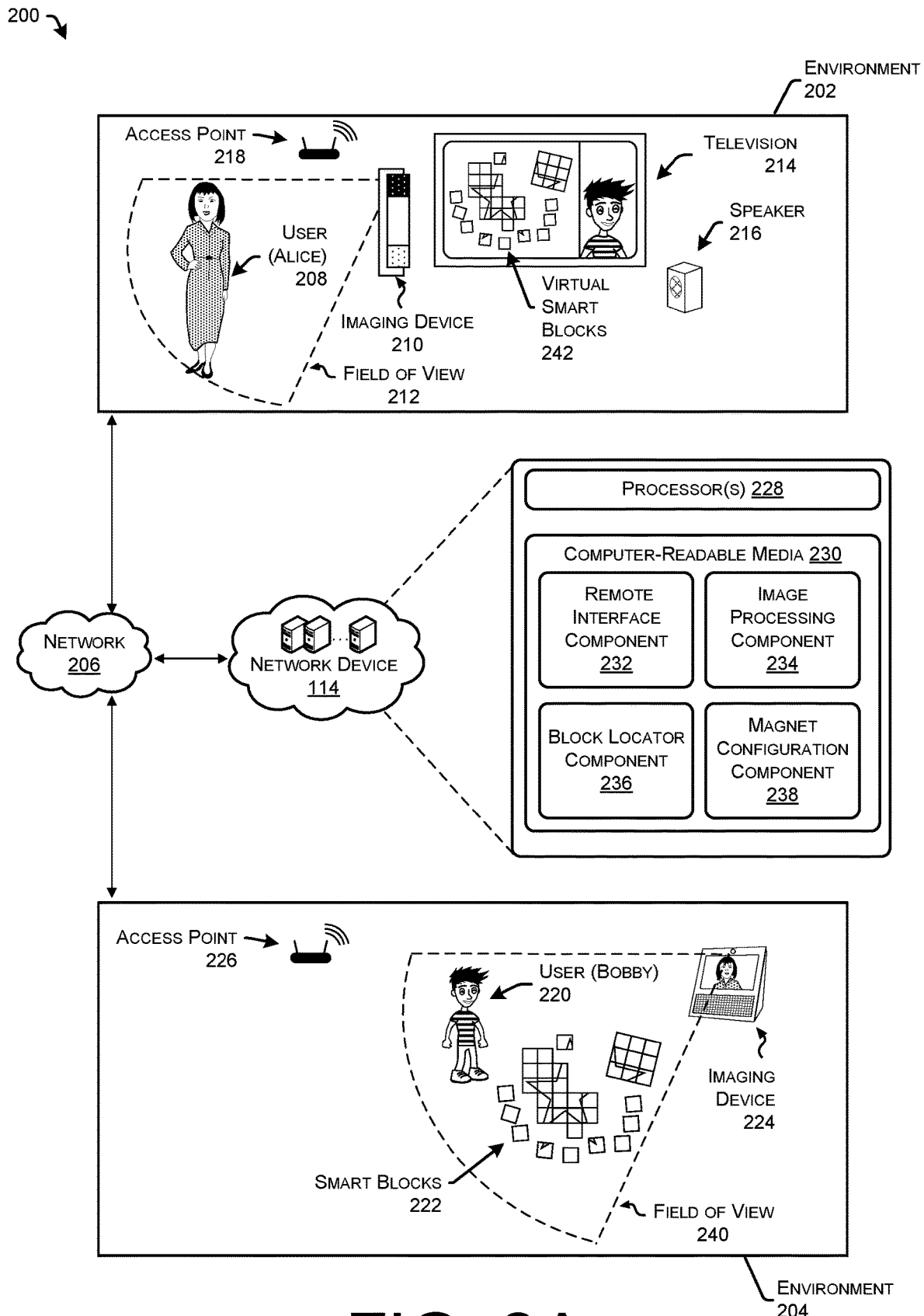
FIG. 2A is a schematic diagram of an illustrative architecture in which users interact using a plurality of smart blocks, in accordance with embodiments of the disclosure.

FIG. 2A is a schematic diagram of an illustrative architecture 200 in which users interact using a plurality of smart blocks, in accordance with embodiments of the disclosure. The architecture 200 includes environments 202 and 204 including multiple devices and multiple users, as discussed herein. Devices in the environments 202 and 204 are communicatively coupled to the network device 114 via the network 206, as discussed herein.

As illustrated, the environment 202 includes a user 208 ("Alice") and various devices, including but not limited to an imaging device 210 having an associated field of view 212, a television 214, a speaker 216, and the like. In some instances, the devices 210, 214, and 216 can be communicatively coupled via an access point 218, which can also provide connectivity with the network 206.

As further illustrated, the environment 204 includes a user 220 ("Bobby") interacting with one or more smart blocks 222. Further, the environment 204 can include various devices, including but not limited to an imaging device 224 associated with a field of view 240. Further, the devices 222 and 224 can include functionality to capture and/or present audio and/or images, and may be communicatively coupled with the network 206 and other devices via an access point 226.

As can be understood in the context of this disclosure, the environments 202 and 204 can include any number of devices, any number of users, any layout including individual rooms or zones, and the like.

The network device 114 can generally refer to a network-accessible platform—or "cloud-based service"—implemented as a computing infrastructure of processors, storage, software, data access, and so forth that is maintained and accessible via the network 206, such as the internet. Cloud-based services may not require end-user knowledge of the physical location and configuration of the system that delivers the services. Common expressions associated with cloud-based services, such as the network device 114, include "on-demand computing," "software as a service (SaaS)," "platform computing," "network accessible platform," and so forth. In some instances, cloud-based services can be provided via a remote network device. In some instances, some or all of the functionality of the network device 114 can be provided by a computing device located within the environments 202 and 204, and in some instances, a network device located in a user environment can be referred to as a local network device. That is to say, a user can maintain a computing device at their home, for example, to function as a "hub" to coordinate activity and communication between individual devices and the network device 114, as discussed herein.

Further, the network device 114 can include a processor 228 and a computer-readable media 230. In some implementations, the processors(s) 228 can include a central processing unit (CPU), a graphics processing unit (GPU), both CPU and GPU, a microprocessor, a digital signal processor or other processing units or components known in the art. Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 228 can possess its own local memory, which also can store program modules, program data, and/or one or more operating systems.

The computer-readable media 230 can include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 230 can be implemented as computer-readable storage media ("CRSM"), which can be any available physical media accessible by the processor(s) 228 to execute instructions stored on the memory 230. In one basic implementation, CRSM can include random access memory ("RAM") and Flash memory. In other implementations, CRSM can include, but is not limited to, read-only memory ("ROM"), electrically erasable programmable read-only memory ("EEPROM"), or any other tangible medium which can be used to store the desired information and which can be accessed by the processor(s) 228.

Several components such as instructions, data stores, and so forth can be stored within the computer-readable media 230 and configured to execute on the processor(s) 228. A few example functional components are shown as applications stored in the computer-readable media 230 and executed on the processor(s) 828, although the same functionality can alternatively be implemented in hardware, firmware, or as a system on a chip (SOC).

A remote interface component 232 can be configured to provide a remote interface to a computing device that is remote to the smart blocks 222. For example, the remote interface component 232 can provide a user interface on the television 214 in the environment 202 presenting virtual smart blocks 242 that correspond to locations of the smart blocks 222. In some instances, the remote interface component 232 can receive input from a user to provide a variety of functions. For example, the remote interface component 232 can be configured to receive input to select content to be presented via the smart blocks 222. For example, a user can select content to be presented on a single smart block or on a plurality of smart blocks. Further, the user can select a game or application to be used in conjunction with the smart blocks 222. In some instances, examples of applications or games can include, but are not limited to: puzzles; building games; matching games; counting games; videos; learning games (e.g., letters, numbers, animals, etc.); and the like. Of course, it may be appreciated that the number of applications, games, and/or content to be utilized and/or presented in connection with the smart blocks 222 is virtually limitless.

In some instances, the remote interface component 232 can be configured to interact with the smart blocks 222 remotely. For example, the virtual smart blocks 242 can be selected by the user 208 via the television 214 to cause a corresponding interaction on the smart blocks 222. By way of example, the user 208 can select a smart block on the television 214, thereby causing an indication (e.g., lights, haptic feedback, audio, etc.) to be presented on the corresponding smart block 222 in the environment 204. By way of another example, the user 208 could trace their finger along the surface of the virtual smart blocks 242 causing a corresponding visual indication (or any type of indication) to be displayed or otherwise presented via the smart blocks 222. In some instances, the remote interface component 232 can present images or video of the smart blocks 222 (e.g., captured by the imaging device 224), and in some instances, the remote interface component 232 can present a computer-generated representation of the smart blocks 222 as the virtual smart blocks 242. In some instances, the remote interface component 232 can receive input to set images, video, audio, haptic feedback, etc. associated with various faces of the smart blocks 222.

In some instances, the environment 204 can include a robotic arm or other types of mechatronics that can be manipulated via the remote interface component 232 to move the smart blocks 222 corresponding to movements made to the virtual smart blocks 242.

In some instances, the remote interface component 232 can interface with the smart blocks 222 via the access point 226, for example, to program the smart blocks 222 to commence an application or game.

An image processing component 234 can be configured to receive content to be presented via the smart blocks 222 and perform processing on such content to presentation. For example, the image processing component 234 can receive an image to be presented via the smart blocks 222 and can decompose the image into discrete portions to be presented on individual smart blocks. In an example of utilizing the smart blocks 222 as a puzzle, the image processing component 234 can receive an image and decompose the image into discrete portions based at least in part on a number of the smart blocks 222. In some instances, the image processing component 234 can add annotations, animations, or indications to images to represent a correctly place smart block, an incorrectly placed smart block, a completed puzzle, puzzle hints, and the like.

A block locator component 236 can be configured to receive input from a variety of devices and/or the smart blocks to determine a location of smart blocks 222 during interaction or play. In some instances, the block locator component 236 can receive image data captured by the imaging device 224 to monitor locations of the smart blocks 222 during play. In some instances, the block locator component 236 can receive proximity information and/or movement information captured by individual smart blocks to determine a location of that smart block during play.

A magnet configuration component 238 can include functionality to configure the configurable magnets components of the smart blocks 222 during interactions to introduce attractions or repulsions between smart blocks, depending on an application or game in progress. In some instances, the magnet configuration component 238 can set the configurable magnet components of a smart block to a default value, for example, to induce repulsive forces between smart blocks until a first smart block is correctly oriented with respect to a second smart block, upon which, the magnet configuration component 238 can selectively configure magnets to induce an attractive force between the first and second smart blocks. In some instances, in response to an instruction from the user 208 or in response to completing a puzzle, for example, the magnet configuration component 238 can provide an instruction to some of all of the smart blocks 222 to introduce repulsive forces to separate the smart blocks 222 from a previous configuration (e.g., to break up a puzzle).

Further, the network device 114 can include additional components configured to enable voice commands and interaction with the various components. For example, the network device 114 can include components for automatic speech recognition (ASR) and natural language understanding (NLU) to generate text and identify one or more user voice commands from the generated text. Further, the devices can include a text-to-speech (TTS) component to generate computer-synthesized speech to be output by various devices. Further, the network device 114 can include one or more user profiles storing preferences, user interactions, history, etc., to associate settings and or models with particular users.

The following example illustrates one use case for interacting with a plurality of smart blocks. The user 208 ("Alice") can initiate a conversation with the user 220 ("Bobby") by speaking a wake word (e.g., "Computer . . . ") and uttering a command (e.g., "Connect me to Bobby to assemble a puzzle ") The imaging device 210 in the environment 202 can capture the audio uttered by the user 208 and can transmit the audio to the network device 114. The network device 114 can determine that the audio represents a request from Alice to initiate a communication with Bobby. Based at least in part on one or more user preferences (and/or based at least in part on one or more commands), the network device 114 can determine that the communication is to include a puzzle, and can populate the smart blocks 222 with various portions of images.

In some instances, the image processing component 234 can populate the smart blocks 222 with images based on preferences in a user profile associated with Alice 208 or Bobby 220. For example, the preferences can correspond to a level of difficulty or age of the various users, and can represent a level of randomization of the various images when populating the smart blocks 222 with images.

As the user 220 Bobby interacts with the smart blocks 222, the corresponding movement of the smart blocks 222 can be presented to Alice 208 via the virtual smart blocks 242. In one example, Alice 208 can select a virtual smart block 242, causing a corresponding smart block 222 to glow (e.g., to give a hint to the user 220). As discussed herein, when a puzzle piece (e.g., a smart block) is correctly oriented in the puzzle (e.g., relative to other smart blocks), one or more configurable magnet components in the respective smart blocks can be configured to provide an attraction to guide the user 220 to place a piece and/or to limit movement of the correctly located pieces. Interactions can also include audio, video, and/or haptic feedback presented via the smart blocks. As the user 220 completes the puzzle (e.g., completing the image of a star), the smart blocks 222 can indicate the completion by presenting animations, video, audio, haptic feedback, and the like. In some instances, to restart the game play, the configurable magnets can be configured to induce a repulsive force between some or all of the smart blocks 222, thereby randomizing the locations of the smart blocks 222. Of course, this is but one example of interacting with the smart blocks 222, and any number of interactions are contemplated herein.

Figure 2B:
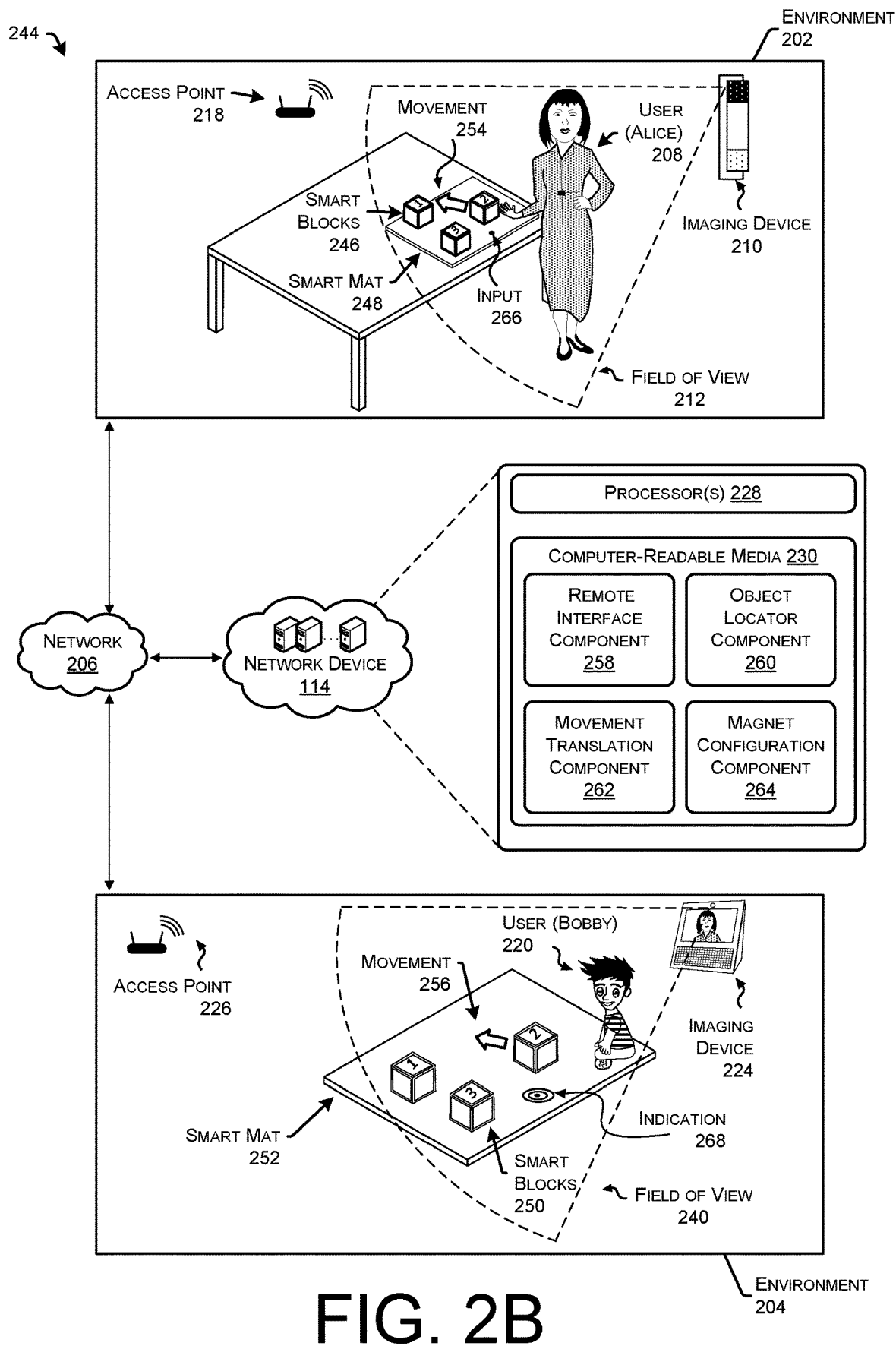
FIG. 2B is a schematic diagram of an illustrative architecture in which users interact using a smart mat, in accordance with embodiments of the disclosure.

FIG. 2B is a schematic diagram of an illustrative architecture 244 in which users interact using a smart mat, in accordance with embodiments of the disclosure. As illustrated, the architecture 244 includes the environments 202 and 204.

In some instances, the user 208 Alice in the environment 202 can interact with the user 220 Bobby via one or more smart blocks 246 and a smart mat 248 communicatively coupled with one or more smart blocks 250 and a smart mat 252. For example, when the user 208 Alice moves one of the smart blocks 246 (e.g., the smart block 246 labeled "2"), represented by movement 254, the smart mat 252 can apply a force to the corresponding one of the smart blocks 250 (e.g., the smart block 250 labeled "2") to move the corresponding smart block to an intended location, represented by movement 256. Thus, movement of one of the smart blocks 246 in the environment 202 can be mirrored by a corresponding movement of one of the smart blocks 250 in the environment 204, and vice versa. That is, movement of one of the smart blocks 246 and 250 can be implemented in a bi-directional manner.

In some instances, interactions with the smart blocks 246 and the smart mat 248 can be transmitted to the network device 114 for processing and subsequent transmission to the smart blocks 250 and smart mat 252. For example, the network device 114 can include the processor(s) 228 and the computer-readable media 230 including a variety of components facilitating remote interactions, as discussed herein. A few example functional components are shown as applications stored in the computer-readable media 230 and executed on the processor(s) 228, although the same functionality can alternatively be implemented in hardware, firmware, or as a system on a chip (SOC).

A remote interface component 258 can include functionality to receive input from the smart mats 248 and 252 and transmit the input to the respective destination. In some instances, the remote interface component 258 can include the functionality of the remote interface component 232 to transmit and/or receive information associated with the smart blocks 246 and 250, for example. Further, in some instances, the smart blocks 246 and the smart mat 248 can be replaced by a user interface presented on a computing device in the environment 202, for example, to provide one or more virtual smart blocks and a virtual smart mat to interact with the physical smart blocks 250 and the smart mat 252.

In general, the remote interface input component 258 can receive input to the smart mat 248, such as touch input by the user 208 Alice. Upon receiving a touch input, for example, the remote interface component 258 can determine a first location of the smart mat 248 associated with the touch input and translate the first location into a second location associated with the smart mat 252 to present an indication of the touch input. For example, the user 208 can touch the smart mat 248, and a corresponding portion of the smart mat 252 can output light corresponding to the touch, for example. In some instances, the remote interface component 258 can receive audio and/or video from the environment 202 (e.g., via one or more image sensors or microphones associated with the smart mat 248 or the imaging device 210) and can provide the audio and/or video to one or more devices in the environment 204.

An object locator component 260 can include functionality to locate objects on the smart mats 248 and 252. For example, in some instances, objects on the smart mats 248 and 252 can include active elements such as wireless transmitters/receivers to exchange identification information with other devices so that an object can be located relative to the smart mats 248 and 252. In some instances, the objects can include passive elements such as patterns or markings on the object that can be sensed by the smart mats 248 and 252. In some instances, the object locator component 260 can receive image data from the environments 202 and/or 204 and determine a location of the objects proximate to the smart mats 248 and 252. Additional functionality provided by the object locator components 260 is discussed throughout this disclosure.

A movement translation component 262 can include functionality to translate movement of an object on the smart mat 248 to a force to be applied to a corresponding object on the smart mat 252. As noted above, movement of objects between the smart mats 248 and 252 can be bidirectional, so that movement of an object on the smart mat 252 can be applied to an object of the smart mat 248, and vice versa.

In some instances, the movement translation component 262 can operate in conjunction with the other components to identify an object being moved on the smart mat 248, identify the corresponding object on the smart mat 252, identify a motion of the object on the smart mat 248, and translate or convert the movement to the smart mat 252. For example, the smart mat 248 and the smart mat 252 can be different sizes, such that the movement may be translated from one coordinate system (e.g., of the smart mat 248) to another coordinate system (e.g., of the smart mat 252). As illustrated, the smart mat 248 may be sized to fit on a table top or desk in the environment 202, while the smart mat 252 may be sized to fit on a floor in the environment 204 such that the user 220 Bobby can sit on the smart mat 252 and interact with the smart blocks 250, as discussed herein.

A magnet configuration component 264 can include functionality to control one or more configurable magnetic components associated with one or more smart blocks 246 and 250 and/or to control one or more components of a configurable magnetic layer associated with the smart mats 248 and 252. Returning to the example of the user 208 moving the smart block 246 (identified as "2"), the magnet configuration component 264 can provide an indication to the corresponding smart block identified as "2" of the smart blocks 250 to set one or more configurable magnet components to a particular magnetic orientation. Further, the magnet configuration component 264 can provide an indication to the configurable magnetic layer in the smart mat 252 to configure one or more magnetic components with complementary magnetic orientations to move the object, as indicated by the movement 256. In some instances, the magnet configuration component 264 can set magnet orientations to attract and/or repel a smart block of the smart blocks 250 to maneuver the smart block identified as "2" in accordance with the movement 256. Additional details of moving such objects are provided throughout this disclosure.

In some instances, the functionality provided by the network device 114 can be implemented in whole or in part in the smart blocks and/or smart mats. That is, in some instances, the smart blocks and/or smart mats can be essentially self-contained devices that do not require the network device 114, and can communicate directly with the various smart blocks and smart mats to provide the functionality discussed herein.

Further, an input 266 on the smart mat 248 can be provided as an indication 268 on the smart mat 252 (and vice versa). In some instances, the indication 268 can include any audio, video, or haptic indications.

Figure 2C:
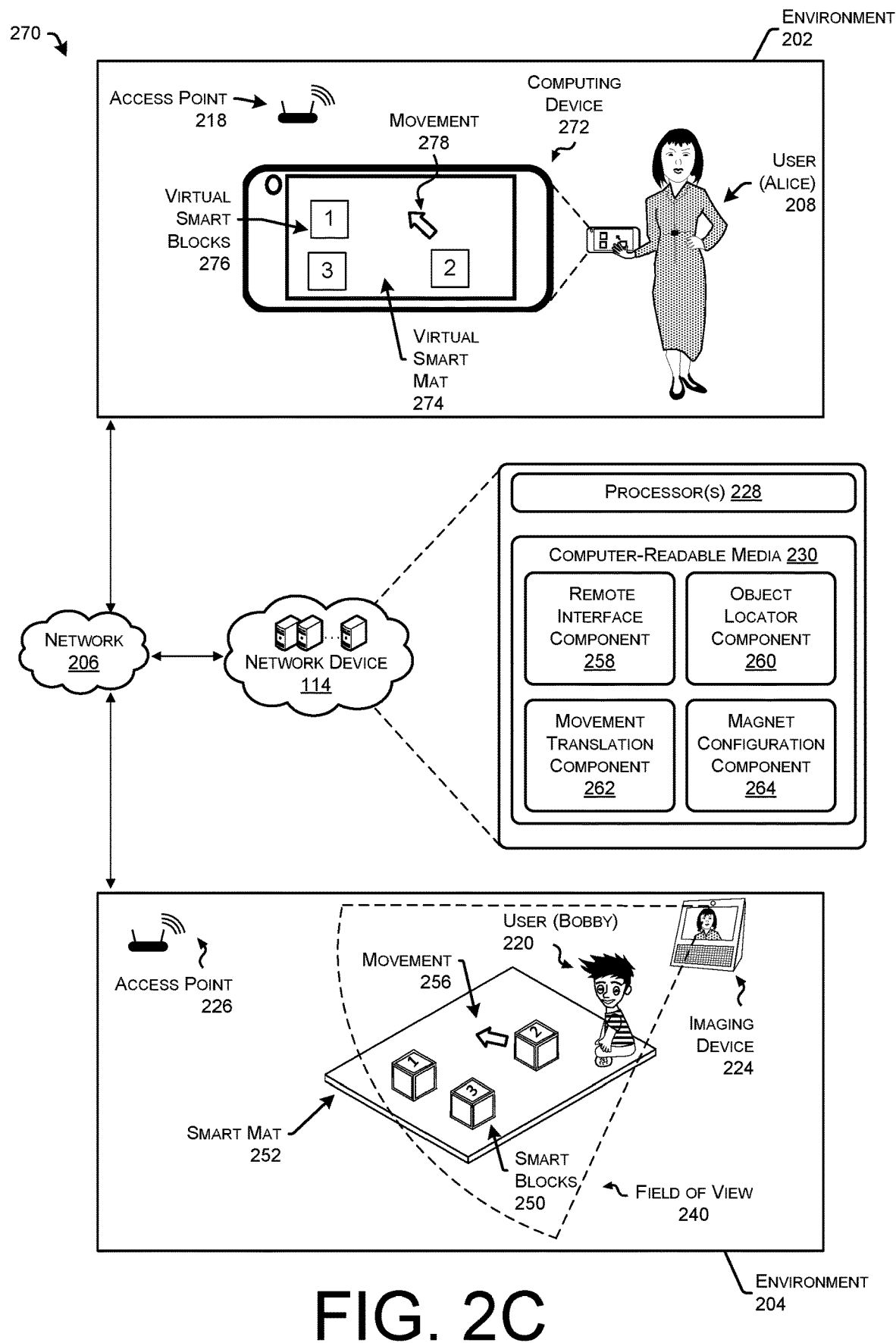
FIG. 2C is a schematic diagram of another illustrative architecture in which users interact using a smart mat, in accordance with embodiments of the disclosure.

FIG. 2C is a schematic diagram of another illustrative architecture 270 in which users interact using a smart mat, in accordance with embodiments of the disclosure. In particular, the user 208 can utilize a computing device 272 presenting a virtual smart mat 274 having virtual smart blocks 276 thereon, such that a movement 278 on the computing device 272 can be reflected as the movement 256 on the smart mat 252. Further, movement of the smart blocks 250 and/or interaction with the smart mat 252 can be represented by the computing device 272.

Figure 3:
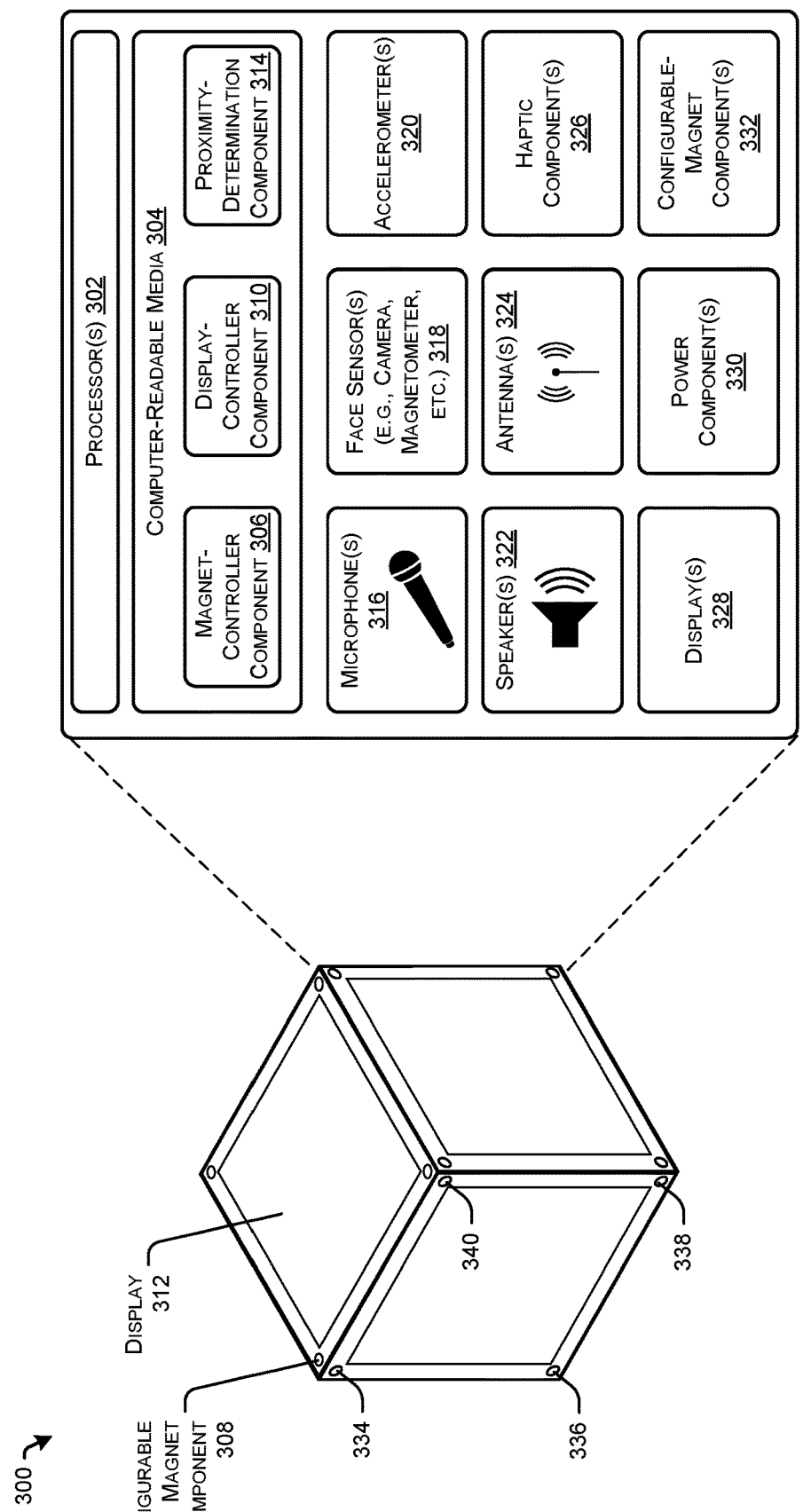
FIG. 3 shows a functional block diagram of selected components of a smart block including configurable magnetic components, in accordance with embodiments of the disclosure.

FIG. 3 shows a functional block diagram of selected components of a smart block 300 including configurable magnetic components, in accordance with embodiments of the disclosure.

In the illustrated implementation, the smart block 300 includes one or more processors 302 and computer-readable media 304. In some implementations, the processor 302 and the computer-readable media 304 can be similar to the processor 228 and the computer-readable media 230, as discussed herein.

Several components such as instructions, data stores, and so forth can be stored within the computer-readable media 304 and configured to execute on the processor(s) 302. A few example functional components are shown as applications stored in the computer-readable media 304 and executed on the processor(s) 302, although the same functionality can alternatively be implemented in hardware, firmware, or as a system on a chip (SOC).

A magnet-controller component 306 can be configured to control one or more configurable magnet components 308 of the smart block 300. A display-controller component 310 can be configured to control one or more displays 312 of the smart block 300. A proximity-determination component 314 can be configured to receive one or more signals or indications from one or more sensors or components of the smart block 300 (or one or more signals or indications from one or more sensors or components of smart blocks that are proximate to the smart block 300) to determine relative locations of faces between smart blocks, as discussed herein.

Further, the computer-readable storage media (CRSM) can include an operating system component configured to manage hardware and services within and coupled to the smart block 300 for the benefit of other components. The smart block 300 can further include, in some instances, a speech-recognition component that employs any number of conventional speech processing techniques such as use of speech recognition, natural-language understanding, and extensive lexicons to interpret voice input. In some instances, the speech-recognition component can simply be programmed to identify the user uttering a predefined word or phrase (e.g., a "wake word"), after which the smart block 300 can begin uploading audio signals to a network device (e.g., the network device 114) for more robust speech-recognition processing. In other examples, the smart block 300 itself can, for example, identify voice commands from users and can provide indications of these commands to the network device 114. In some instances, the smart block 300 can continuously listen to audio in an environment to determine a location of a user. In some instances, a continuous audio stream can be analyzed at a computing device located in an environment of the user, while selectively uploading audio to a network device remote from the environment. The smart block 300 can also include a plurality of applications or games stored in the computer-readable media 304 or otherwise accessible to the smart block 300.

Generally, the smart block 300 includes a variety of components, including but not limited to: one or more microphones 316; one or more face sensors 318 (e.g., camera(s) (e.g., image sensors), magnetometer(s), Hall effect sensor(s), capacitive sensor(s), light sensor(s), etc.); one or more accelerometers 320; one or more speakers 322; one or more antennas 324; one or more haptic components 326; one or more displays 328; one or more power components 330; and one or more configurable-magnet components 332. Further, in some implementations, the smart block 300 can be configured to include a keyboard, keypad, mouse, touch screen, joystick, control buttons, and the like.

In some implementations, the one or more microphones 316 can function as input devices to receive audio input, such as user voice input. A user can interact with the smart block 300 by speaking to it, and the one or more microphones 316 captures the user's speech. The smart block 300 can communicate back to the user by emitting audible statements through the one or more speakers 322. In this manner, the user can interact with the smart block 300 solely through speech, without use of a keyboard or display.

Further, in some instances, the one or more microphones 316 can be used to receive audio indications from another smart block to determine an identity of a face proximate to the smart block 300. Additionally, the one or more microphones 316 and the one or more speakers 322 can be used to facilitate a communication with a remote computing device, as discussed herein.

In some instances, the one or more face sensors 318 can include one or more image sensors, magnetometers, Hall effect sensors, light sensors, and the like. The individual faces of the smart block 300 can include duplicative sensors, such that in a smart block 300 implemented as a cube including six faces, each face can include the aforementioned image sensor, magnetometer, etc. In some instances, individual faces of the smart block 300 can include substantially identical components, and in some instances, the individual faces can include different components (e.g., all faces can include an image sensor, but only one face can include a speaker, etc.). It can be appreciated that any number of combinations are contemplated in this disclosure.

In some instances, the magnetometers and/or Hall effect sensors of the face sensor 318 can be used to determine identity information represented by modulating configurable magnets of another smart block. In some instances, image sensors of the face sensors 318 can be used to determine identity information, for example, displayed on a display of the smart blocks. In some instances, the face sensor 318 can determine a magnetic state of proximate faces. For example, the face sensor 318 can determine a magnetic field of a proximate face. In some instances, the face sensor 318 can capture image data to identify a face, and look up a configuration of the face.

In some instances, the one or more accelerometers 320 can be configured to determine, in part, an orientation of the smart block 300 and/or movement of the smart block 300 during interactions. As discussed above, in some instances, the one or more accelerometers 320 can be used to determine which face of the smart block 300 that is oriented towards the ground (e.g., "face down") or oriented towards the sky (e.g., "face up"). Further, in some instances, the one or more accelerometers 320 can determine when the smart block 300 is moved to provide an indication to a remote computing device when a block has been moved.

In some instances, the one or more speakers 322 can output audio indications, audio data corresponding to a communication with a remote user, and/or synthesized speech as part on interacting with a voice assistant, for example. In some instances, the one or more speakers 322 can be used to output identification information uniquely identifying a face of the smart block 300, and in some instances, the one or more speakers 322 can be used conjunction with an echo location system to determine a location of other objects in an environment.

In some instances, the one or more antennas 324 can transmit and/or receive wireless signals for communicating with other smart blocks and/or wireless devices. In some instances, the one or more antennas 324 can operate in conjunction with one or more wireless units to implement one or more of various wireless technologies, such as Wi-Fi, Bluetooth, RF, cellular, satellite, NFC (near-field communication), RFID (radio frequency identification, and so on. As discussed above, in some instances, individual faces of the smart block 300 can include an individual antenna for determining, in part, a proximity of faces to one another. In some instances, the one or more antennas 324 can be used to communicate wirelessly with one or more remote computing devices via a network such as the interne. In some instances, the smart blocks 300 can communicate in a mesh network (e.g., directly between smart blocks) and/or via an access point.

In some instances, the one or more haptic components 326 can provide haptic feedback to users when interacting with the smart block 300. For example, the haptic components 326 can include one or more vibration motors configured to vibrate the smart block 300 in one or more predetermined directions. In some instances, the haptic components 326 can be activated to randomize an orientation of the smart block 300 (e.g., in connection with starting a game, finishing a game, etc.). In some instances, the haptic components 326 can be incorporated into the one or more displays 328 to vary a coefficient of friction associated with the one or more displays 328 during an interaction with the displays.

In some instances, the one or more displays 328 can be incorporated into one or more of the faces of the smart block 300. For example, in a smart block implemented as a cube, the smart block can include one or more displays on each side of the cube. In some instances, the one or more displays 328 can be implemented as high-resolution displays, e-ink displays, tactile electronic displays (e.g., refreshable Braille displays), segment displays, LED (light-emitting diode) displays, LCDs (liquid crystal displays), laser displays, holographic displays, and the like. In some instances, the one or more displays 328 can incorporate one or more touch screens and/or capacitive sensing. In some instances, the smart block 300 can receive light projected from a projector to present content.

In some instances, the one or more power components 330 provide electrical power to the smart block 300. In some instances, the power components 330 can include one or more batteries, capacitors, inductors, chargers, ports, etc. to receive and store power. In some instances, the power components 330 can include contact charging or inductive charging systems to receive power from a variety of mechanisms. In some instances, the power components 330 can couple with a corresponding power component of another smart block to exchange power between smart blocks (e.g., as pass through charging). Thus, in some instances involving a plurality of smart blocks, only a first smart block can be connected to an electrical grid power system, while other smart blocks can be electrically coupled to the first smart block to receive power. In some instances, the one or more power components 330 can include a USB (universal serial bus) to receive power. In some instances, the power components 330 can receive power provided via inductive coupling from a corresponding power mat or charging mat. Instances, the one or more power components 330 can include induction coil configured to generate electrical energy from an electromagnetic field generated by a corresponding charging element.

In some instances, the one or more configurable magnet components 332 are configured to vary a direction of a magnetic field based at least in part on an identity of a face of another smart block proximate to the one or more configurable magnet components 332. In some instances, a single face of the smart block 300 can include a plurality of individually configurable magnet components. For example, the smart block 300 can include a first configurable magnet component 334, a second configurable magnet component 336, a third configurable magnet component 338, and a fourth configurable magnet component 340, and as noted above, each magnet component 334, 336, 338, and 340 can be individually controlled independent of the other magnet components. For example, at a first time, the configurable magnet component 334 can output a "North" magnetic field, the configurable magnet component 336 can output a "South" magnetic field, the configurable magnet component 338 can output a "North" magnetic field, and the configurable magnet component 340 can output a "South" magnetic field. Upon determining that an incorrectly oriented face of another smart block is proximate to the configurable magnet components 334, 336, 338, and 340 (e.g., similar to the example 150), and upon determining that the configurable magnet components of the incorrectly oriented face are in a "North" state, the configurable magnet components 334, 336, 338, and 340 can be configured to a "North" state, thereby repelling the incorrectly oriented face. Upon determining that a correctly oriented face of another smart block is proximate to the configurable magnet components 334, 336, 338, and 340 (e.g., similar to the example 154), and upon determining that the configurable magnet components of the correctly oriented face are in a "North" state, the configurable magnet components 334, 336, 338, and 340 can be configured to a "South" state, thereby attracting the correctly oriented face. Of course, the states of the configurable magnet components are not limited to the examples discussed herein.

In some cases, the configurable magnet components 308, 334, 336, 338, and 340 can be recessed under a surface of the smart block 300, and/or a display may be installed over the configurable magnet components 308, 334, 336, 338, and 340 to present a nearly seamless smart block 300 with displays as the exterior surface.

Additional details of the one or more configurable magnet components 332 are discussed below in connection with FIGS. 7A-7D.

Figure 4A:
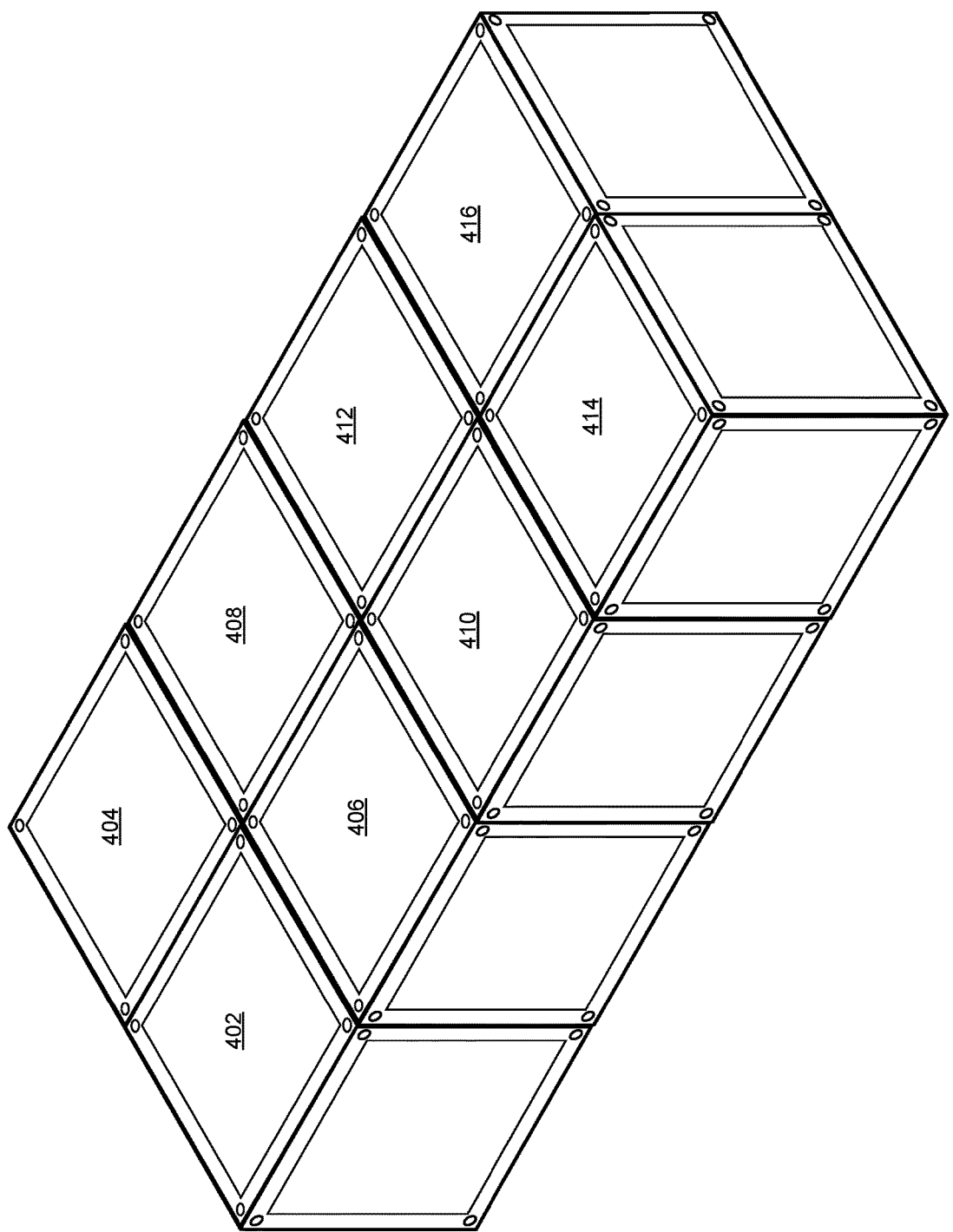
FIG. 4A is an isometric view of a plurality of smart blocks joined together, in accordance with embodiments of the disclosure.

FIG. 4A is an isometric view 400 of a plurality of smart blocks joined together, in accordance with embodiments of the disclosure. For example, the view 400 illustrates a plurality of smart blocks 402, 404, 406, 408, 412, 414, and 416 coupled together to form a rectangular object. Of course, the smart blocks 402-416 can be coupled in any configuration, depending on an application or game associated with the operation of the smart blocks 402-416.

Figure 4B:
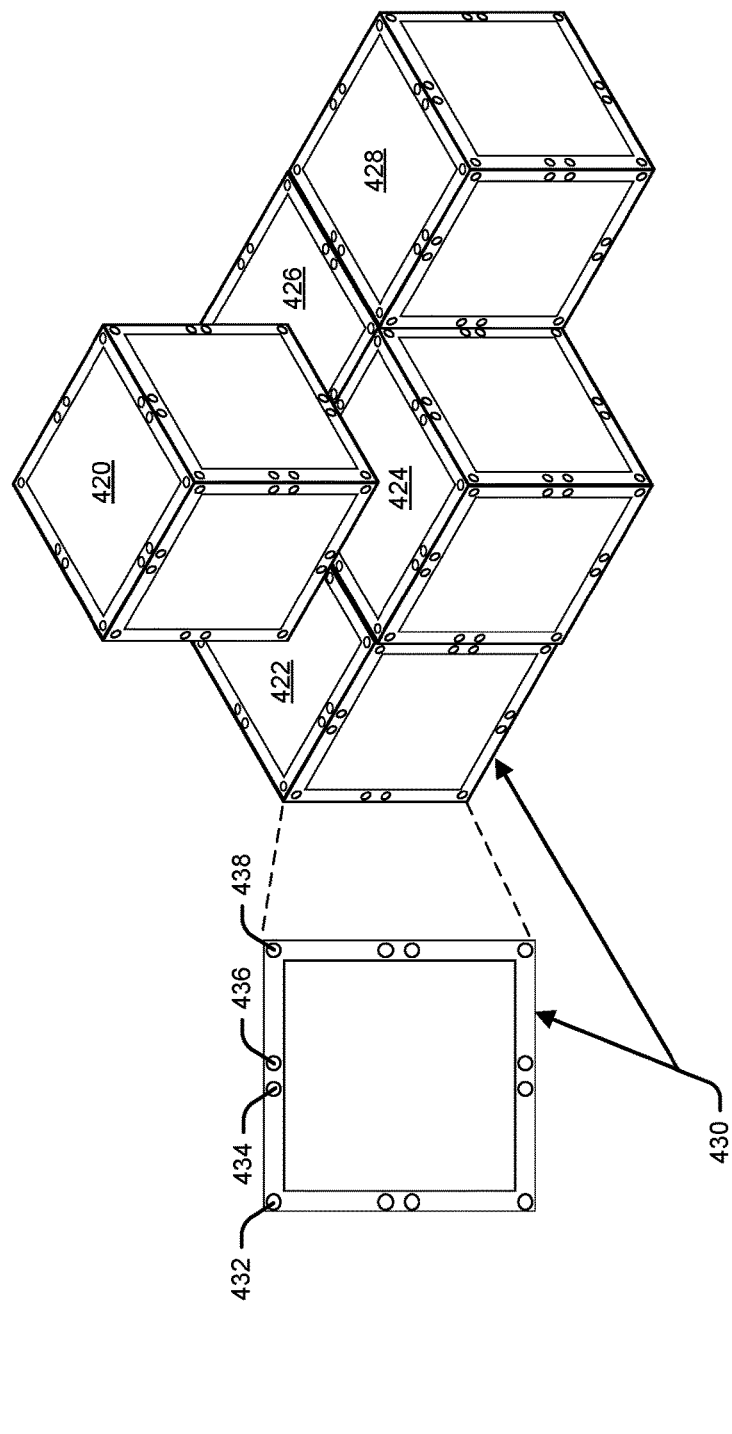
FIG. 4B is an isometric view of a plurality of smart blocks with configurable magnets distributed at intervals along a face of a smart block, and an example configuration of such smart blocks, in accordance with embodiments of the disclosure.

FIG. 4B is an isometric view 418 of a plurality of smart blocks with configurable magnet components distributed at intervals along a face of a smart block, and an example configuration of such smart blocks, in accordance with embodiments of the disclosure. For example, the view 418 illustrates a plurality of smart blocks 420, 422, 424, 426, and 428 coupled together to form an object. As illustrated, the smart block 420 is illustrated as being partially stacked on top of the smart blocks 422, 424, and 426. Of course, the smart blocks 420, 422, 424, 426, and 428 can be coupled in any configuration, depending on an application or game associated with the operation of the smart blocks 420, 422, 424, 426, and 428.

In some instances, the distribution of configurable magnet components on a face 430 of the smart block 422 (and corresponding configurable magnet components on other faces of the smart blocks 420, 422, 424, 426, and 428, for example) allows the smart block 420 to partially overlap the smart blocks 422, 424, and 426, as illustrated in the view 418. For example, the face 430 includes configurable magnet components 432, 434, 436, and 438 along a top edge of the face 430. Thus, smart blocks 420, 422, 424, 426, and 428 can be arranged/coupled/connected in any manner, and in particular, can be connected to partially overlap with a plurality of smart blocks, as illustrated in the view 418.

Figure 5:
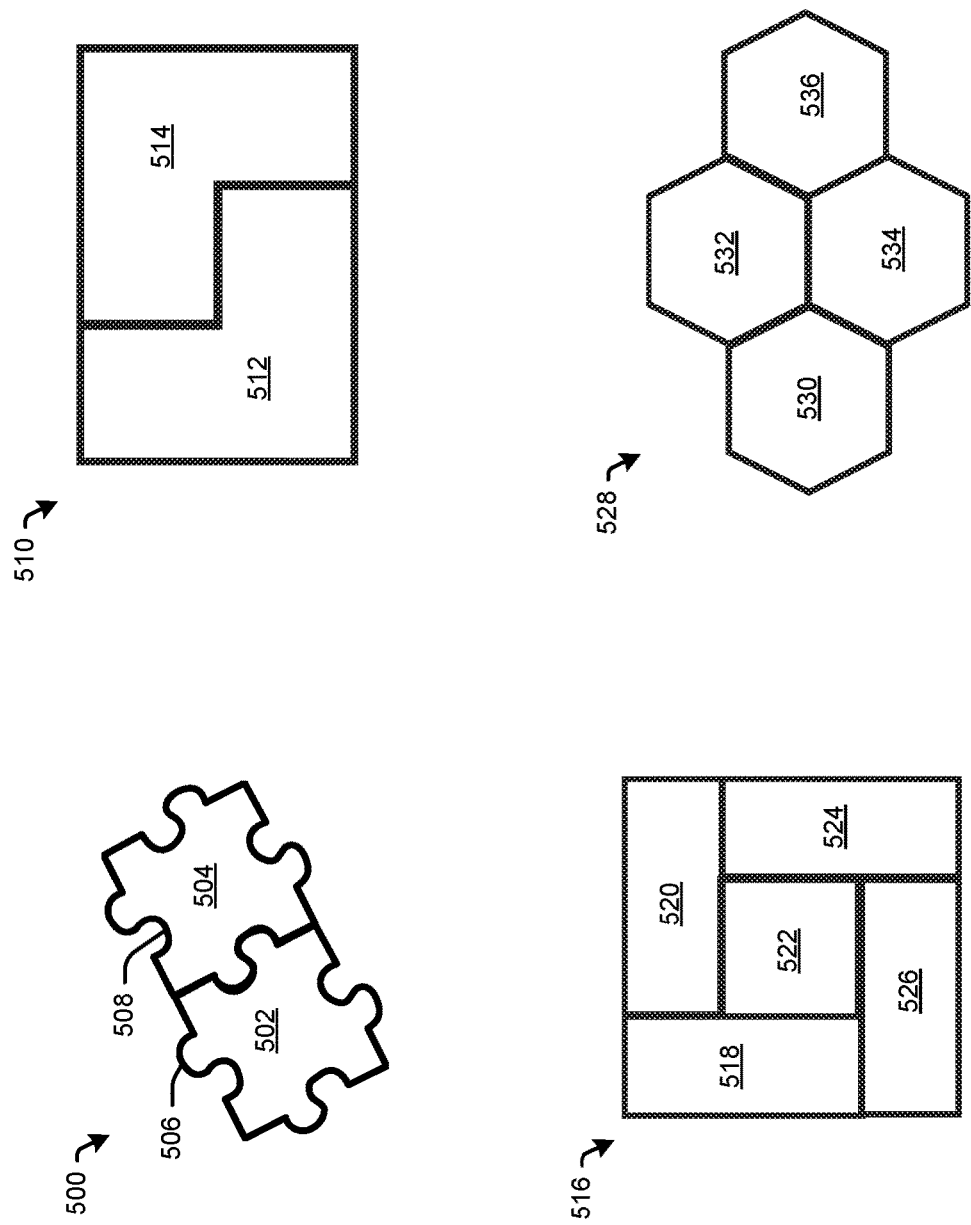
FIG. 5 illustrates various examples of smart blocks, in accordance with embodiments of the disclosure.

FIG. 5 illustrates various examples of smart blocks, in accordance with embodiments of the disclosure. In general, the smart blocks can take any shape or size, and can be implemented in a variety of ways. In an example 500, smart blocks 502 and 504 can be implemented as connectable objects. In some instances, the smart blocks 502 and 504 can include complementary protrusions 506 and receivers 508 to connect the smart blocks 502 and 504 in any orientation. In some instances, the protrusions 506 and receiver 508 can be implemented in addition to or instead of the configurable magnet components, as discussed herein.

In an example 510, smart blocks 512 and 514 can be implemented as asymmetrical shapes that can be nested and/or coupled together, as illustrated.

In an example 516, smart blocks 518, 520, 522, 524, and 526 can be implemented as various shapes that can be coupled together, as illustrated. In some instances, the smart blocks 518, 520, 522, 524, and 526 may vary in size or shapes.

In an example 528, smart blocks 530, 532, 534, and 536 can be implemented as various shapes that can be coupled together. In some instances, the smart blocks 530, 532, 534, and 536 can be implemented with a hexagonal shape on at least one face, as illustrated. In some instances, the smart blocks 530, 532, 534, and 536 can be implemented as a hexagonal prism. Additional shapes of smart blocks can include, but are not limited to, tetrahedrons, octahedrons, icosahedrons, dodecahedrons, cones, rectangles, spheres, cylinders, and the like.

Figure 6:
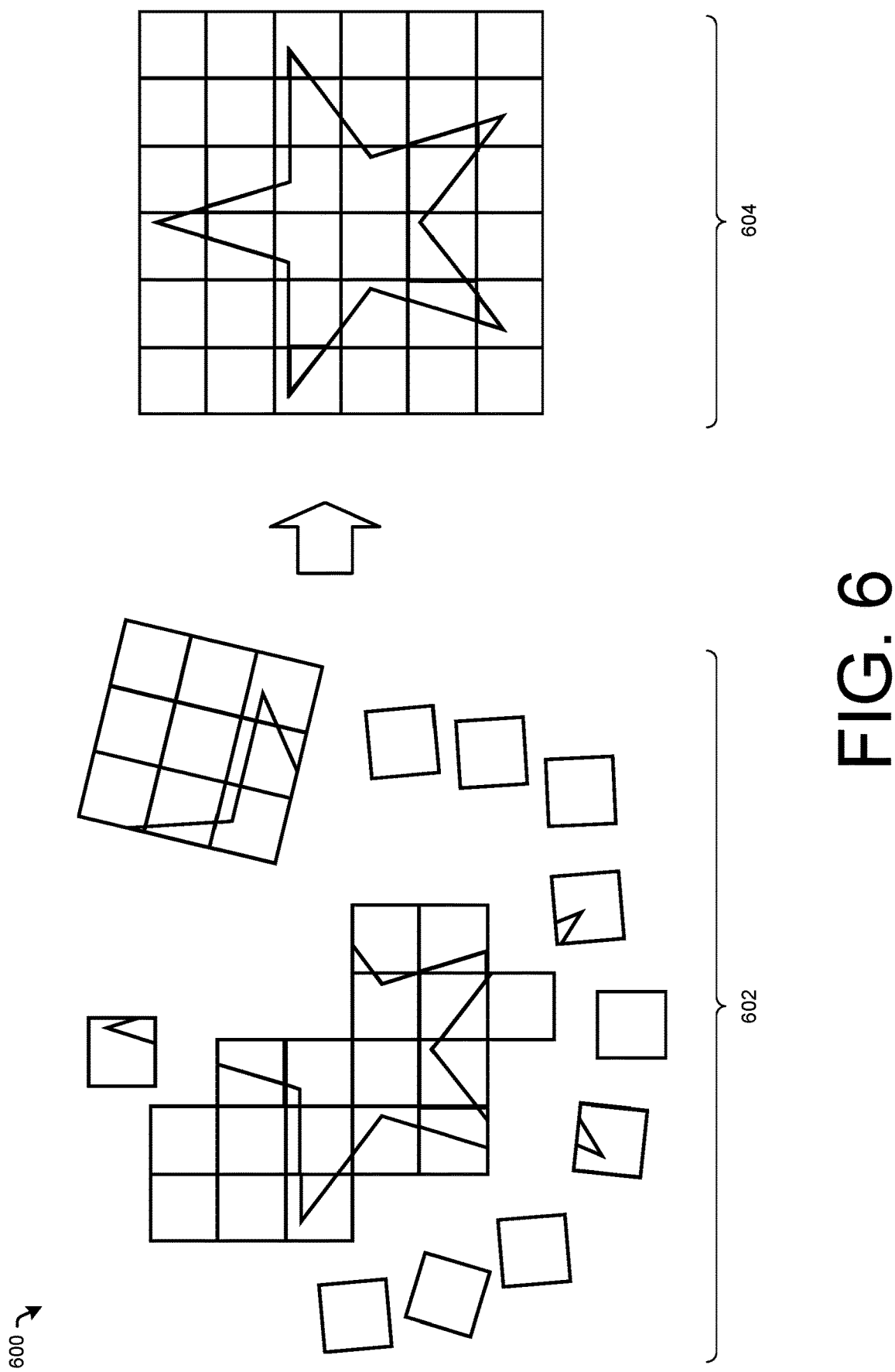
FIG. 6 illustrates an example of an array of smart blocks used as a virtual puzzle, in accordance with embodiments of the disclosure.

FIG. 6 illustrates an example 600 of an array of smart blocks used as a virtual puzzle, in accordance with embodiments of the disclosure. In an example 602, a plurality of smart blocks are illustrated as representing a portion of a puzzle As illustrated, some smart blocks are coupled together, while others are uncoupled. As can be understood in the context of this disclosure, an example 604 illustrates the completed puzzle FIGS. 7A-7D illustrate various states of an example configurable magnet component, in accordance with embodiments of the disclosure. In general, FIGS. 7A-7D illustrate a configurable magnet component having a configurable magnet oriented in one of four configurable positions. Accordingly, the configurable magnet can be controlled to attract or repel corresponding configurable magnet (alternatively, electromagnetic or electro-magnetic) components to guide interaction with various smart blocks, as discussed herein.

Figure 7A:
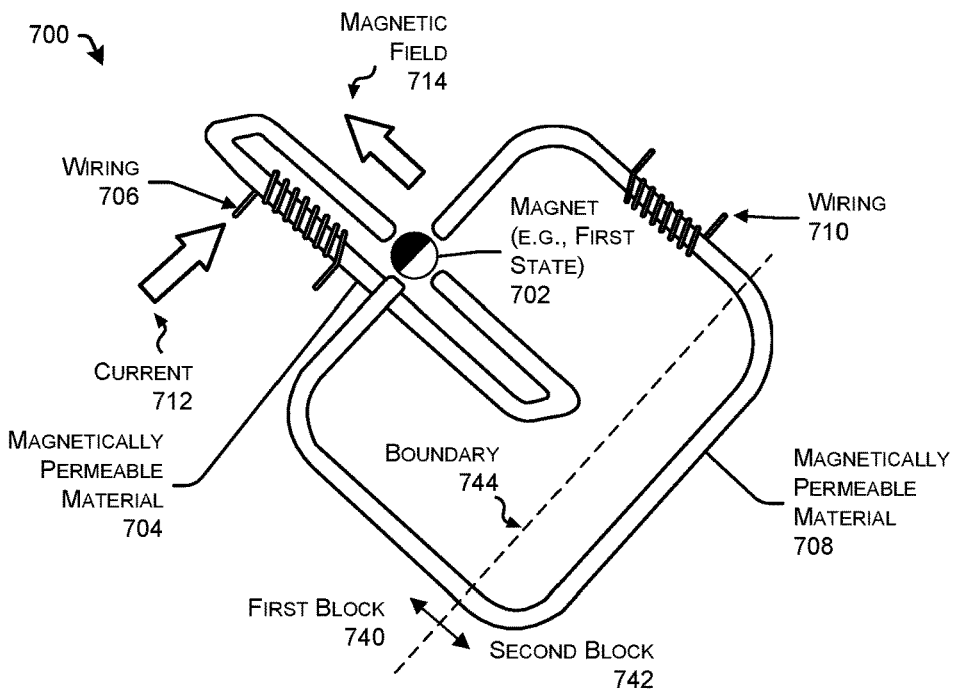
FIGS. 7A-7D illustrate various states of an example configurable magnet component, in accordance with embodiments of the disclosure.

FIG. 7A illustrates a first state of an example configurable magnet component 700. In general, the configurable magnet component 700 can include a magnet 702 which can be movably mounted to rotate to various positions when controlled, as discussed herein. The magnet 702 can be a permanent magnet (e.g., a ferromagnetic material) including dual poles (often referred to a "North" and "South" poles).

As illustrated, the two halves of the magnet 702 (indicated by black and white coloring) can correspond to poles of the magnet 702.

The magnet 702 can be movably mounted and disposed between at least a portion of a first magnetically permeable material 704 having wiring 706 coiled around the magnetically permeable material 704. As discussed below, the wiring 706 can be coupled to an electrical power supply configured to apply current in at least one direction. In some instances, the electrical power supply can include one or more batteries and corresponding charging circuits, voltage regulators, switching circuits, circuit protection, and the like.

Additionally, the magnet 702 can be movably mounted and disposed between at least a portion of a second magnetically permeable material 708 having wiring 710 coiled around the magnetically permeable material 708. As discussed below, the wiring 710 can be coupled to an electrical power supply configured to apply current in at least one direction.

In some instances, the magnetically permeable materials 704 and 708 can include, but are not limited to, steel, iron, cobalt-iron, electrical steel, stainless steel, carbon steel, nickel, and the like.

As illustrated, a first current 712 can be applied to the first wiring 706, thereby generating a magnetic field illustrated as a magnetic field 714. In response to the magnetic field 714, the magnet 702 can rotate (via the movable mounting) to align the magnetic field associated with the magnet 702 with the magnetic field 714. Accordingly, when the current 712 is stopped, ceased, or otherwise removed, the magnet 702 can maintain its position and the configurable magnet component 700 can maintain the orientation of the magnet 702.

In some instances, a first portion of the magnetically permeable material 708 can be embodied in a first block 740 and a second portion of the magnetically permeable material 708 can be embodied in a second block 742. In some instances, a boundary 744 can represent the first block 740 in contact with the second block 742. For example, the first block 740 can represent the first smart block 134 and the second block 742 can represent the second smart block 136. Accordingly, it can be understood that a cross section of the magnetically permeable material 708 can be represented by the configurable magnet components 334 and 340, for example.

Figure 7B:
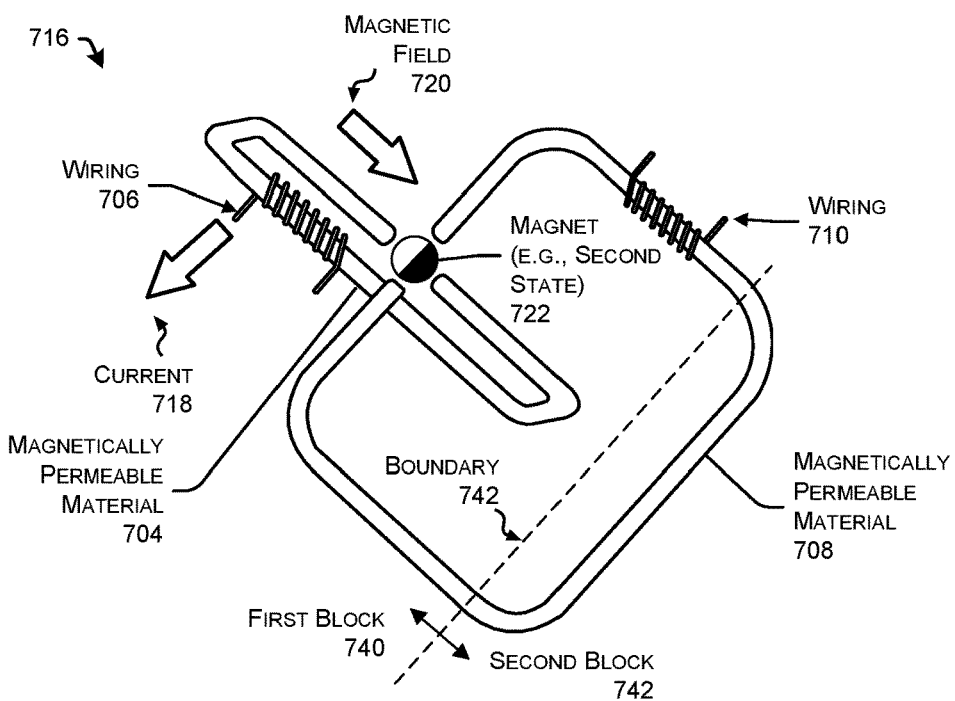

FIG. 7B illustrates a second state of an example configurable magnet component 716. In this example, a current 718 can be applied to the wiring 706, resulting in a magnetic field 720 that is in a direction that is opposite the magnetic field 714. Accordingly, a magnet 722 illustrates a second state of the magnet 722. With respect to FIGS. 7A and 7B, the magnet 702 represents an orientation producing a magnetic field 714 that is opposite the magnet 722 and its associated magnetic field 720. In this manner, a direction of current can be reversed to reverse a direction of the magnets 702 and 722, respectively.

Figure 7C:
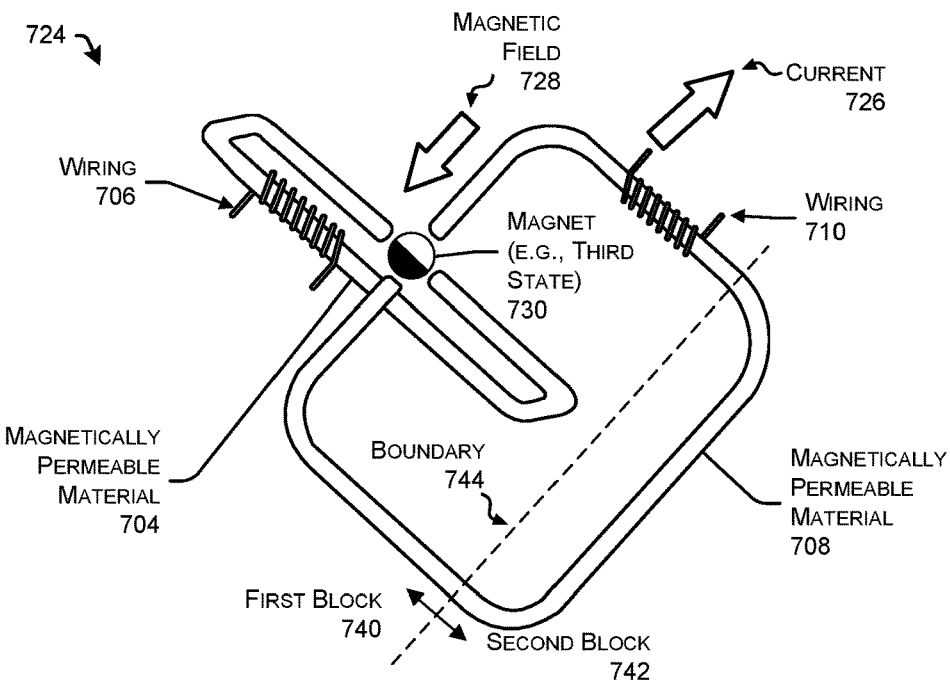

FIG. 7C illustrates a third state of an example configurable magnet component 724. In this example, a current 726 can be applied to the wiring 710, resulting in a magnetic field 728. In some instances, the magnetic field 728 can be substantially perpendicular to the magnetic field 714 and 720 of FIGS. 7A and 7B, respectively. Accordingly, a magnet 730 illustrates a third state of the magnet 730.

Figure 7D:
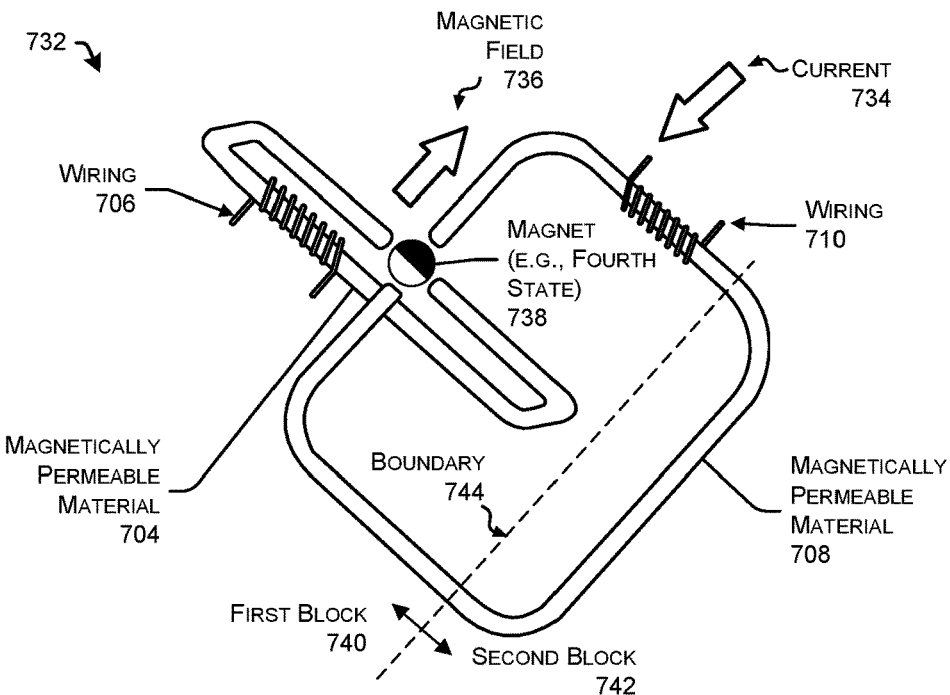

FIG. 7D illustrates a fourth state of an example configurable magnet component 732. In this example, a current 734 can be applied to the wiring 710, resulting in a magnetic field 736 that is in a direction that is opposite the magnetic field 728. Accordingly, a magnet 738 illustrates a fourth state of the magnet 738. With respect to FIGS. 7C and 7D, the magnet 730 represents an orientation producing a magnetic field 728 that is opposite the magnet 738 and its associated magnetic field 736. In this manner, a direction of current can be reversed to reverse a direction of the magnets 730 and 738, respectively.

In an embodiment including the configuration discussed above, a magnet can be controlled to be oriented in one of four states or positions. In some instances, the electromagnets (e.g., the magnetically permeable materials 708 and 708 coupled with the wiring 706 and 710, respectively) used in conjunction with the permanent magnet 702, 722, 730, and 738 allows for a magnetic field to be varied with a current pulse, while the direction of the magnetic field can remain fixed in the absence of another pulse to change direction. Of course, other implementations and configurations are contemplated as well.

FIGS. 1A, 1B, 8, 14 and 15 illustrate example processes in accordance with embodiments of the disclosure. Each process described herein is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media can include non-transitory computer-readable storage media, which can include hard drives, floppy diskettes, optical discs, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media can include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

Figure 8:
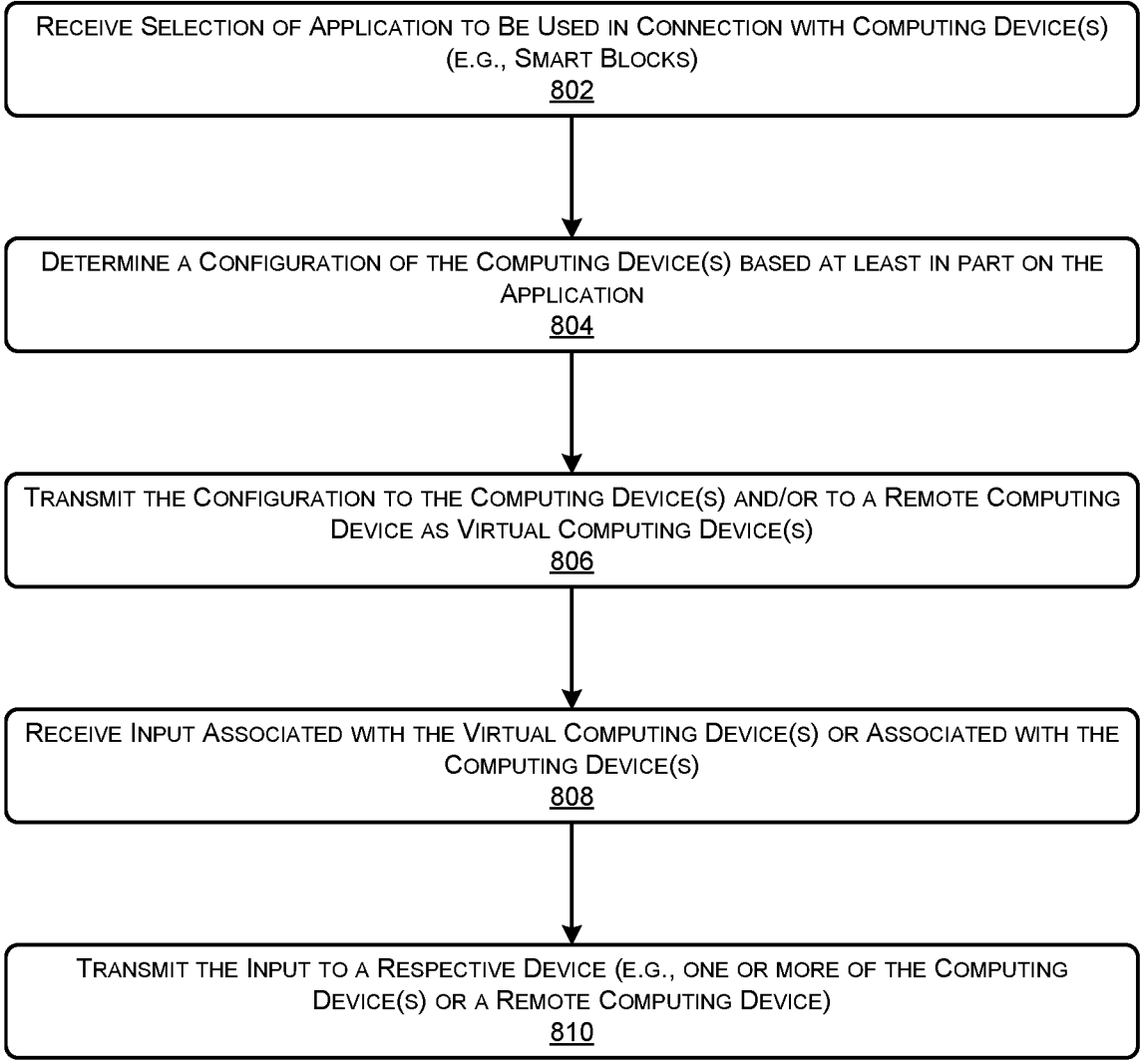
FIG. 8 illustrates an example flow diagram of a process for facilitating interactions between users including input associated with one or more smart blocks, in accordance with embodiments of the disclosure.

FIG. 8 illustrates an example flow diagram of a process 800 for facilitating interactions between users including input associated with one or more computing devices, in accordance with embodiments of the disclosure. For example, aspects of the process 800 can be performed by the network device 114, as illustrated in FIGS. 1A, 1B, 2A, 2B and 2C.

At 802, the operation can include receiving a selection of an application to be used in connection with computing devices(s) (e.g., smart blocks). In some instances, the operation 802 can include receiving a selection via one or more of a user interface, voice command, gesture, and the like, from a smart block, a computing device in an environment including the smart blocks, and/or a remote computing device. In some instances, the application to be used in connection with the smart blocks can include games, as discussed herein.

At 804, the operation can include determining a configuration of the computing device(s) based at least in part on the application. In some instances, the operation 804 can include determining a number of the smart blocks, a type of content to be presented on the smart blocks, and the like. For example, the content can be an image to be decomposed to be presented as portions when utilizing the smart blocks as a puzzle. In some instances, the operation 804 can include establishing an initial configuration of configurable magnets for various faces of the smart blocks.

At 806, the operation can include transmitting the configuration to the computing device(s) and/or to a remote computing device as virtual computing device(s). In some instances, this operation 806 can initialize the smart blocks by causing the configuration (e.g., including content, magnet configurations, etc.) to be downloaded or otherwise transmitted to the various smart blocks. In some instances, the operation 806 can include transmitting the configuration to a remote computing device to present a configuration of the smart blocks as virtual smart blocks via a display, as discussed herein. In such an example, a user proximate to the remote computing device can "follow along" with the interactions and can converse and introduce their own interactions with the smart blocks, as discussed herein.

At 808, the operation can include receiving input associated with virtual computing device(s) or associated with the computing device(s), as discussed herein. For example, the virtual smart blocks can be presented via a remote computing device. In some examples, a remote user can provide an input to the remote computing device, which can be received at the network device, for example, to be provided to the smart blocks in an environment. In some examples, the smart blocks can receive an input (e.g., such as being picked up, moved to another location, touched, turned upside-down, and the like), and such input can be transmitted to and received by the network device 114.

At 810, the operation can include transmitting the input to a respective device. If the input is received via the smart blocks, the input can be provided to the remote computing device and can be reflected in the presentation of the virtual smart blocks. If the input is received via the virtual smart blocks, the input can be provided to the smart blocks and can be reflected in the audio, video, or haptic feedback output by the smart blocks. In this manner, the smart blocks, network device, and virtual smart blocks enable interactivity, communication, wonder, and fun.

Figure 9:
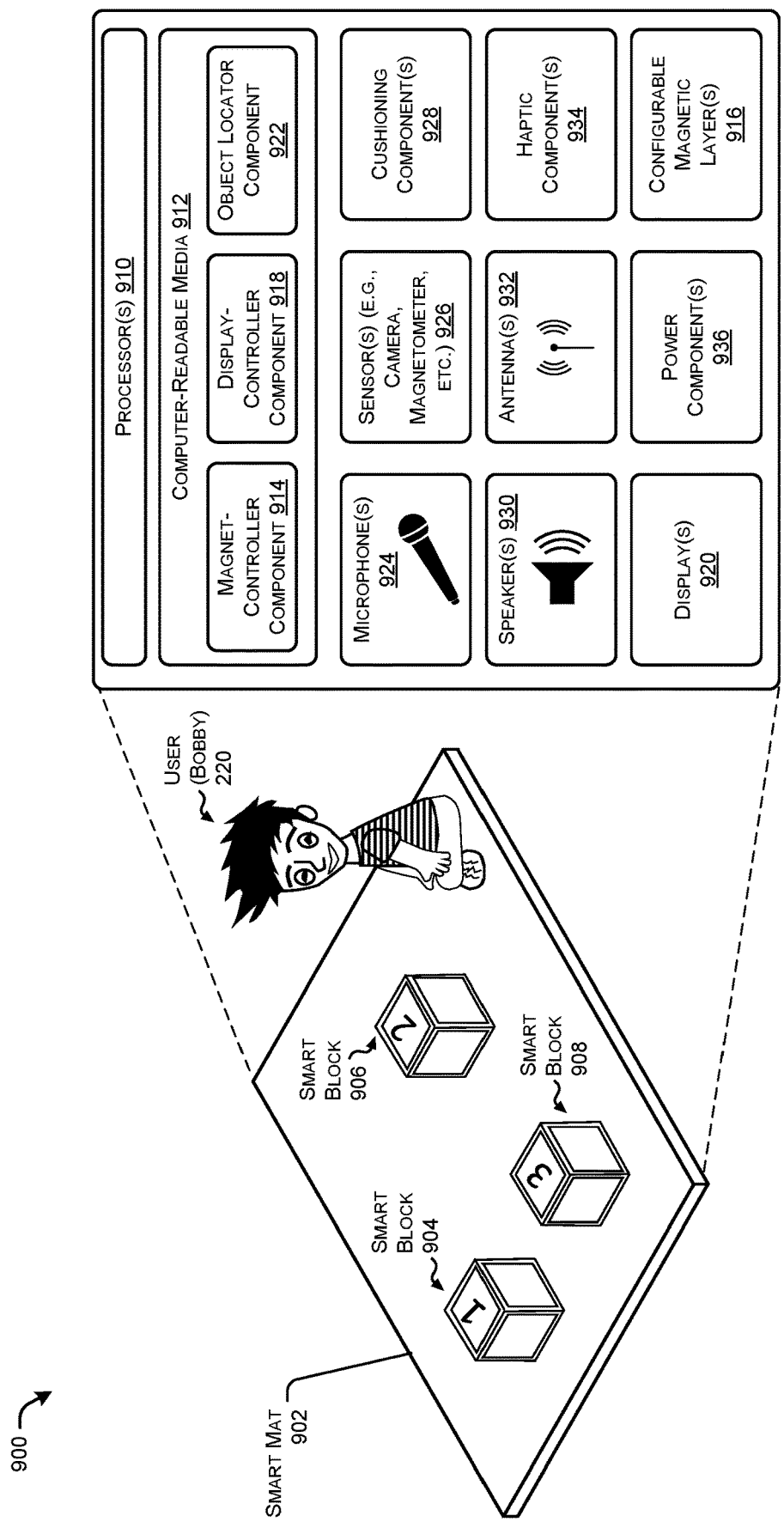
FIG. 9 shows a functional block diagram of selected components of a smart mat including a configurable magnetic layer, in accordance with embodiments of the disclosure.

FIG. 9 shows a functional block diagram 900 of selected components of a smart mat 902 including a configurable magnetic layer, in accordance with embodiments of the disclosure. For context, smart blocks 904, 906, and 908 are illustrated as being located on the smart mat 902. Further, the user 220 Bobby is illustrated as sitting on the smart mat 902 to interact with the smart mat 902 and/or the smart blocks 904, 906, and 908.

In the illustrated implementation, the smart mat 902 includes one or more processors 910 and computer-readable media 912. In some implementations, the processor 910 and the computer-readable media 912 can be similar to the processor 228 and the computer-readable media 230, as discussed herein.

Several components such as instructions, data stores, and so forth can be stored within the computer-readable media 912 and configured to execute on the processor(s) 910. A few example functional components are shown as applications stored in the computer-readable media 912 and executed on the processor(s) 910, although the same functionality can alternatively be implemented in hardware, firmware, or as a system on a chip (SOC).

A magnet-controller component 914 can be configured to control one or more configurable magnetic layer(s) 916 of the smart mat 902. A display-controller component 918 can be configured to control one or more displays 920 of the smart mat 902. An object locator component 922 can be configured to receive one or more signals or indications from one or more sensors or components of the smart mat 902 (or one or more signals or indications from one or more sensors or components of smart blocks that are proximate to the smart mat 902) to determine locations of objections thereon.

In some instances, the object locator component 922 can operate in connection with the one or more displays 920 to output a visual indication unique to each position on the smart mat 902 such that the smart blocks 904, 906 and 908 located on the smart may 902 can detect the visual indication to determine a location of a respective smart block on the smart mat 902, for example.

Further, the computer-readable storage media (CRSM) can include an operating system component configured to manage hardware and services within and coupled to the smart mat 902 for the benefit of other components. The smart mat 902 can further include, in some instances, a speech-recognition component that employs any number of conventional speech processing techniques such as use of speech recognition, natural-language understanding, and extensive lexicons to interpret voice input. In some instances, the speech-recognition component can simply be programmed to identify the user uttering a predefined word or phrase (e.g., a "wake word"), after which the smart mat 902 can begin uploading audio signals to a network device (e.g., the network device 114) for more robust speech-recognition processing. In other examples, the smart mat 902 itself can, for example, identify voice commands from users and can provide indications of these commands to the network device 114. In some instances, the smart mat 902 can continuously listen to audio in an environment to determine a location of a user. In some instances, a continuous audio stream can be analyzed at a computing device located in an environment of the user, while selectively uploading audio to a network device remote from the environment. The smart mat 902 can also include a plurality of applications or games stored in the computer-readable media 912 or otherwise accessible to the smart mat 902.

Generally, the smart mat 902 includes a variety of components, including but not limited to: one or more microphones 924; one or more sensors 926 (e.g., camera(s) (e.g., image sensors), magnetometer(s), Hall effect sensor(s), capacitive sensor(s), resistive sensors, light sensor(s), pressure sensors, accelerometers, barometers, etc.); one or more cushioning components 928; one or more speakers 930; one or more antennas 932; one or more haptic components 934; one or more displays 920; one or more power components 936; and one or more configurable magnetic layers 916. Further, in some implementations, the smart mat 902 can be configured to include a keyboard, keypad, mouse, touch screen, joystick, control buttons, and the like.

In some implementations, the one or more microphones 924 can function as input devices to receive audio input, such as user voice input. A user can interact with the smart mat 902 by speaking to it, and the one or more microphones 924 captures the user's speech. The smart mat 902 can communicate back to the user by emitting audible statements through the one or more speakers 930. In this manner, the user can interact with the smart mat 902 solely through speech, without use of a keyboard or display. Additionally, the user can interact with the smart mat 902 using touch input, as discussed herein.

Further, in some instances, the one or more microphones 924 can be used to receive audio indications from the various smart blocks 904, 906, and 908 to determine an identity and/or location associated with the smart blocks 904, 906, and 908. For example, the smart blocks 904, 906, and 906 can output an audio signal (such as ultrasonic audio) that uniquely identifies a smart block and/or a specific face of a smart block. In some instances, the smart mat 902 can include various microphones located throughout the smart mat 902 (e.g., in each corner of the smart mat 902) to receive such audio and to determine identities, locations, and/or orientations of the smart blocks 904, 906, and 908 on the smart mat 902. Additionally, the one or more microphones 924 and the one or more speakers 930 can be used to facilitate a communication with a remote computing device, as discussed herein.

In some instances, the one or more sensors 926 can include one or more image sensors, magnetometers, Hall effect sensors, light sensors, pressure sensors, and the like. The smart mat 902 can include duplicative sensors, such that multiple sensors can be used to determine an identity and/or location of various objects placed on the smart mat 902. It can be appreciated that any number of combinations of sensors are contemplated in this disclosure.

In some instances, the one or more cushioning components 928 can be configured to provide a soft or cushioned surface of the smart mat 902. For example, the cushioning components 928 can include a gel layer, foam layer, cloth layer, air layer, etc., to allow the user 220 Bobby to sit on the smart mat 902 over time in comfort. Additional details of the cushioning components 928 are discussed in connection with FIG. 10, for example.

In some instances, the one or more speakers 930 can output audio indications, audio data corresponding to a communication with a remote user, and/or synthesized speech as part on interacting with a voice assistant, for example. In some instances, the one or more speakers 930 can be used to output identification information to the user 220 identifying locations of the smart mat 902, and/or identifying relative locations or directions of objects on the smart mat 902. In some instances, the one or more speakers 930 can be used conjunction with an echo location system to determine a location of other objects in an environment.

In some instances, the one or more antennas 932 can transmit and/or receive wireless signals for communicating with the smart blocks 904, 906, and 908, and/or wireless devices. In some instances, the one or more antennas 932 can operate in conjunction with one or more wireless units to implement one or more of various wireless technologies, such as Wi-Fi, Bluetooth, RF, cellular, satellite, NFC (near-field communication), RFID (radio frequency identification, and so on. As discussed above, in some instances, individual faces of the smart blocks 904, 906, and 908 can include an individual antenna for determining, in part, a proximity of faces to one another. In some instances, the one or more antennas 932 can be used located in the corners of the smart mat 902, for example, to triangulate a position of the smart blocks 904, 906, and 908 on the smart mat 902. Further the one or more antennas 932 can communicate wirelessly with one or more remote computing devices via a network such as the interne. In some instances, the smart mat 902 and the smart blocks 904, 906, and 908 can communicate in a mesh network (e.g., directly between device) and/or via an access point (such as the access points 218 or 226). For example, content to be presented on the smart blocks 904, 906, and 908 can be transmitted to the smart mat 902, and in turn, can be transmitted to the smart blocks 904, 906, and 908.

In some instances, the one or more haptic components 934 can provide haptic feedback to users when interacting with the smart mat 902. For example, the haptic components 934 can include one or more vibration motors configured to vibrate the smart mat 902 in one or more predetermined directions. In some instances, the haptic components 934 can be activated to randomize an orientation of the smart blocks 904, 906, and 908 (e.g., in connection with starting a game, finishing a game, etc.). In some instances, the haptic components 934 can be incorporated into the one or more displays 920 to vary a coefficient of friction associated with the one or more displays 920 during an interaction with the displays. Further, the one or more haptic components 934 can be utilized to generate waves to move one or objects located on the smart mat 902. For example, the one or more haptic components 934 (and/or the one or more speakers 930) can generate waves creating low-pressure areas and high-pressure areas of air that can be steered, thereby imparting movement to one or more objects on the smart mat 902.

In some instances, the one or more displays 920 can be incorporated into the smart mat 902. In some instances, the one or more displays 920 can be implemented as high-resolution displays, e-ink displays, tactile electronic displays (e.g., refreshable Braille displays), segment displays, LED (light-emitting diode) displays, LCDs (liquid crystal displays), laser displays, holographic displays, and the like. In some instances, the one or more displays 920 can be implemented as a low-resolution display formed by a grid of LEDs, for example. In some instances, the one or more displays 920 can incorporate one or more touch screens, capacitive sensing, and/or resistive sensing. In some instances, the smart mat 902 can receive light projected from a projector to present content.

In some instances, the one or more power components 936 provide electrical power to the smart mat 902. In some instances, the power components 936 can include one or more batteries, capacitors, inductors, chargers, ports, etc. to receive and store power. In some instances, the power components 936 can include contact charging or inductive charging systems to receive power or to transmit power to or from a variety of mechanisms or devices (such as the smart blocks 904, 906, and 908). In some instances, the one or more power components 936 can include an inductive coil configured to create an alternating electromagnetic field to transfer power to an inductive coil in a corresponding device. In some instances, the one or more power components 936 can include a USB (universal serial bus) to receive power.

In some instances, the one or more configurable magnetic layers 916 can include functionality to generate magnetic field(s) to move objects on the smart mat 902, such as the smart blocks 904, 906, and 908. In some instances, the configurable magnetic layers 916 can include an array or grid of wiring that, when a pulse of current is applied to the wiring, generates a magnetic field that can move a corresponding object. For example, in some instances, the array can include parallel wiring configured to receive a pulse of current to move an object. In other examples, the configurable magnetic layers 916 can include a grid including coils of wiring that are individually addressable to receive a pulse of current to generate a magnetic field. In some instances, portions of the configurable magnetic layers 916 can be activated in a coordinated fashion to attract and repel various smart blocks located on the smart mat 902. Additional details of the one or more configurable magnetic layers 916 are discussed in FIGS. 10, 11, and 12, and throughout this disclosure.

In addition to or instead of the one or more configurable magnetic layers 916, the smart mat 902 can include other mechanisms to move objects on the smart mat 902. For example, the smart mat 902 can include an external robotic arm to move objects, and in some cases the smart mat 902 can include an internal robotic arm (e.g., operating under the display) to selectively engage objects using a configurable magnet, for example, and to move the object to an intended location. Further, in some cases, the smart mat 902 can move objects using puffs of air. Thus, the smart mat 902 can include a variety of mechanism to impart movement to objects on the smart mat 902.

Although discussed in the context of smart blocks 904, 906, and 908, any type of object may be placed on the smart mat 902 to interact with the smart mat 902 and/or the users 208 and 220.

Figure 10:
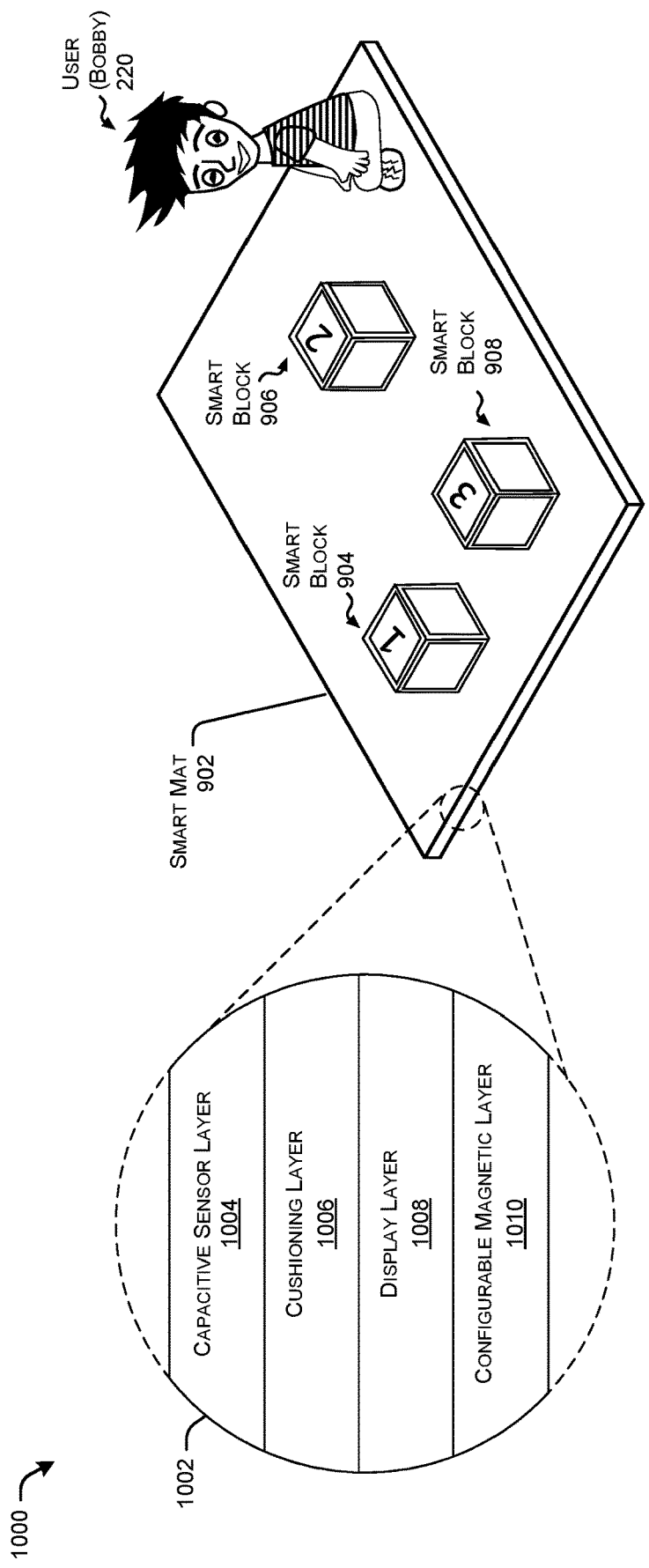
FIG. 10 shows a functional block diagram of selected layers of a smart mat, in accordance with embodiments of the disclosure.

FIG. 10 shows a functional block diagram 1000 of selected layers of a smart mat, in accordance with embodiments of the disclosure. A detail 1002 illustrates a capacitive sensor layer 1004, a cushioning layer 1006, a display layer 1008, and a configurable magnetic layer 1010. In some instances, the smart mat 902 can include additional or fewer layers, and in some instances, the layers 1004, 1006, 1008, and 1010 can be implemented in a different order. Additionally, layers can be combined or omitted entirely. For example, in some cases, the configurable magnetic layer 1010 can be located at the top of the layers, or in the middle of the layers, depending on the implementation. In some instances, the cushioning layer 1006 can be located at the top of the layers. In some instances, the smart mat 902 can include an additional protective layer to encapsulate the internal layers to provide protections from water and the like. Of course, the sizes (e.g., thicknesses) of the layers 1004, 1006, 1008, and 1010 are illustrative and are not intended to represent an exemplary implementation. A variety of combinations and orders of layers are contemplated herein.

Figure 11:
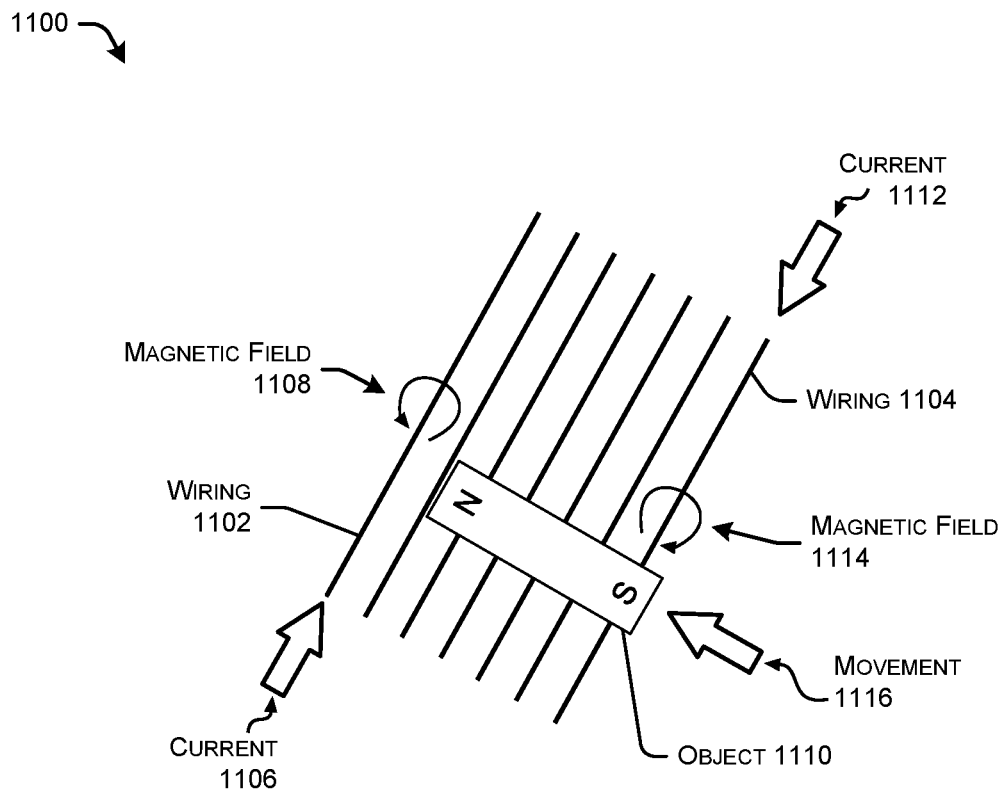
FIG. 11 illustrates details of an example of a configurable magnetic layer of the smart mat, in accordance with embodiments of the disclosure.

FIG. 11 illustrates details of an example of a configurable magnetic layer 1100 of the smart mat, in accordance with embodiments of the disclosure. In some instances, the configurable magnetic layer 1100 includes wiring 1102 and 1104 embedded in one or more other layers of the smart mat 902, for example. The wiring 1102 and 1104 can individually receive a pulse of current to generate a magnetic field and cause movement of an object placed above the configurable magnetic layer 1100.

As illustrated, the configurable magnetic layer 1100 includes a plurality of wires in parallel. A first current 1106 can be applied to the wiring 1102 in a first direction to generate a magnetic field 1108, for example, in a counter-clockwise direction around the wiring 1102. In some instances, this magnetic field 1108 can interact with an object 1110 with a particular magnetic orientation (e.g., illustrated by the poles "N", corresponding to "North", and "S", corresponding to "South") to attract the object 1110 towards the wiring 1102.

In some instances, a second current 1112 can be applied to the wiring 1104 to generate a magnetic field 1114, for example, in a clockwise direction around the wiring 1104. In some instances, the magnetic field 1114 can interact with the object 1110 to repel the object 1110 to "push" the object 1110 in a direction indicated by a movement 1116.

As the object 1110 moves relative to the configurable magnetic layer 1100, various currents can be applied in a manner to push and pull the object in a desired direction. Thus, the configurable magnetic layer 1100 can apply a force onto the object 1110, thereby causing movement of the object 1110 in a controllable fashion, in accordance with embodiments with the disclosure.

Figure 12:
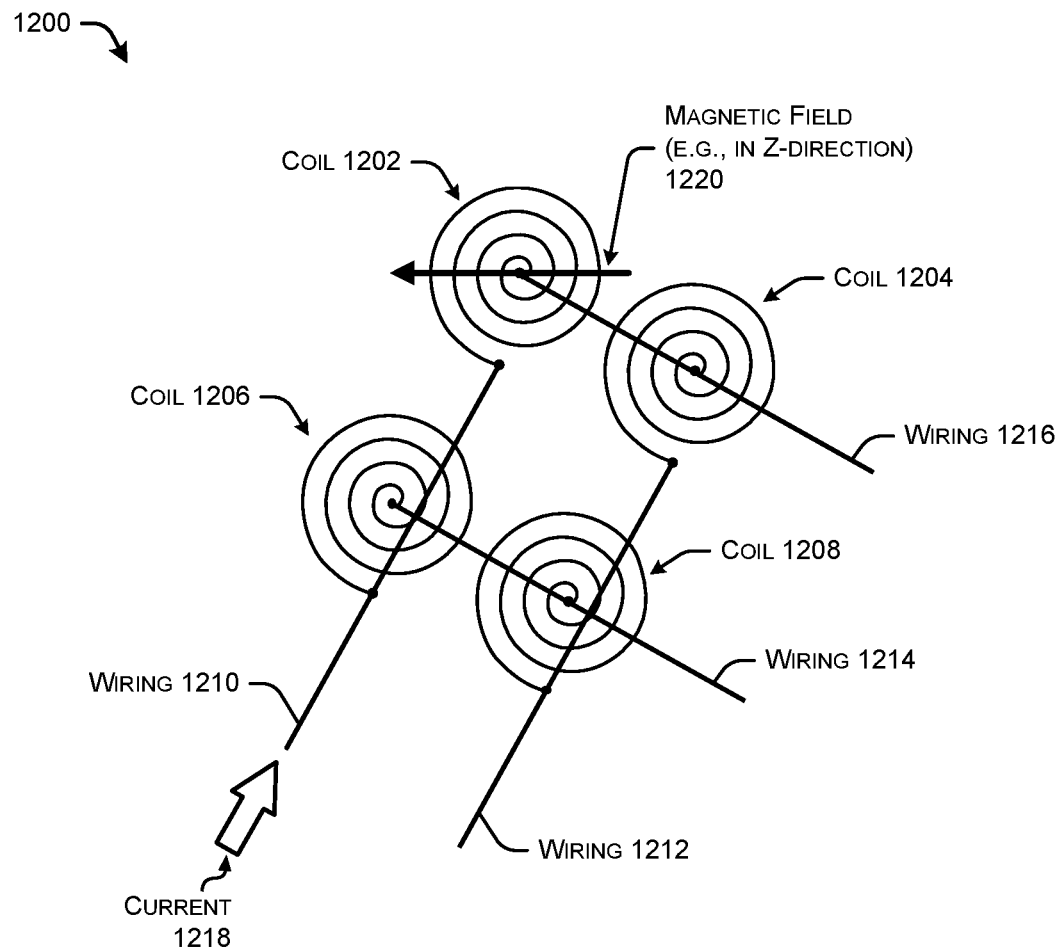
FIG. 12 illustrates details of another example of a configurable magnetic layer of the smart mat, in accordance with embodiments of the disclosure.

FIG. 12 illustrates details of another example of a configurable magnetic layer 1200 of the smart mat, in accordance with embodiments of the disclosure. In some instances, the configurable magnetic layer 1200 includes coils 1202, 1204, 1206, and 1208 coupled with various wires 1210, 1212, 1214, and 1216. As discussed herein, the coils 1202, 1204, 1206, and 1208 can be individually activated to generate a magnetic field in a z-direction, relative to the x-y orientation of the coils 1202, 1204, 1206, and 1208 illustrated in FIG. 12.

In one example, circuit components (e.g., switches, transistors, etc.) can be activated to apply a current to the coil 1206 by selecting the wiring 1210 and 1216 and applying a current 1218 through the wiring 1210, coil 1202, and the wiring 1216 to generate a magnetic field 1220 (e.g., in a z-direction ("into the page")). In another example, a direction of current can be reversed, generating a magnetic field in an opposite direction (e.g., in a z-direction ("out of the page")). In some examples, voltage of the wiring 1210, 1212, 1214, and 1216 can be set to any voltage (e.g., positive, negative, or zero) to cause any magnitude of current in any direction.

In some embodiments, the coils 1202, 1204, 1206, and 1208 can be individually electrically addressable. That is, each coil can be associated with individual wiring that is not shared or coupled with other coils.

In some instances, the coils 1202, 1204, 1206, and 1208 generally include a spiral-type coil, a pancake-type coil, a planar coil, or other solenoid configured to generate a magnetic field in response to a current applied to the wiring.

In some instance, the coils can be configured to determine a magnetic state of objects placed above the coils. For example, a current can be pulsed along the wires and to a corresponding coil, and based at least in part on the magnetic state, the coil can detect a reflected pulse in the current. In some instance, the magnetic state of an object can be determined by a rise time in the current pulse applied to a coil compared to a threshold value.

Figure 13:
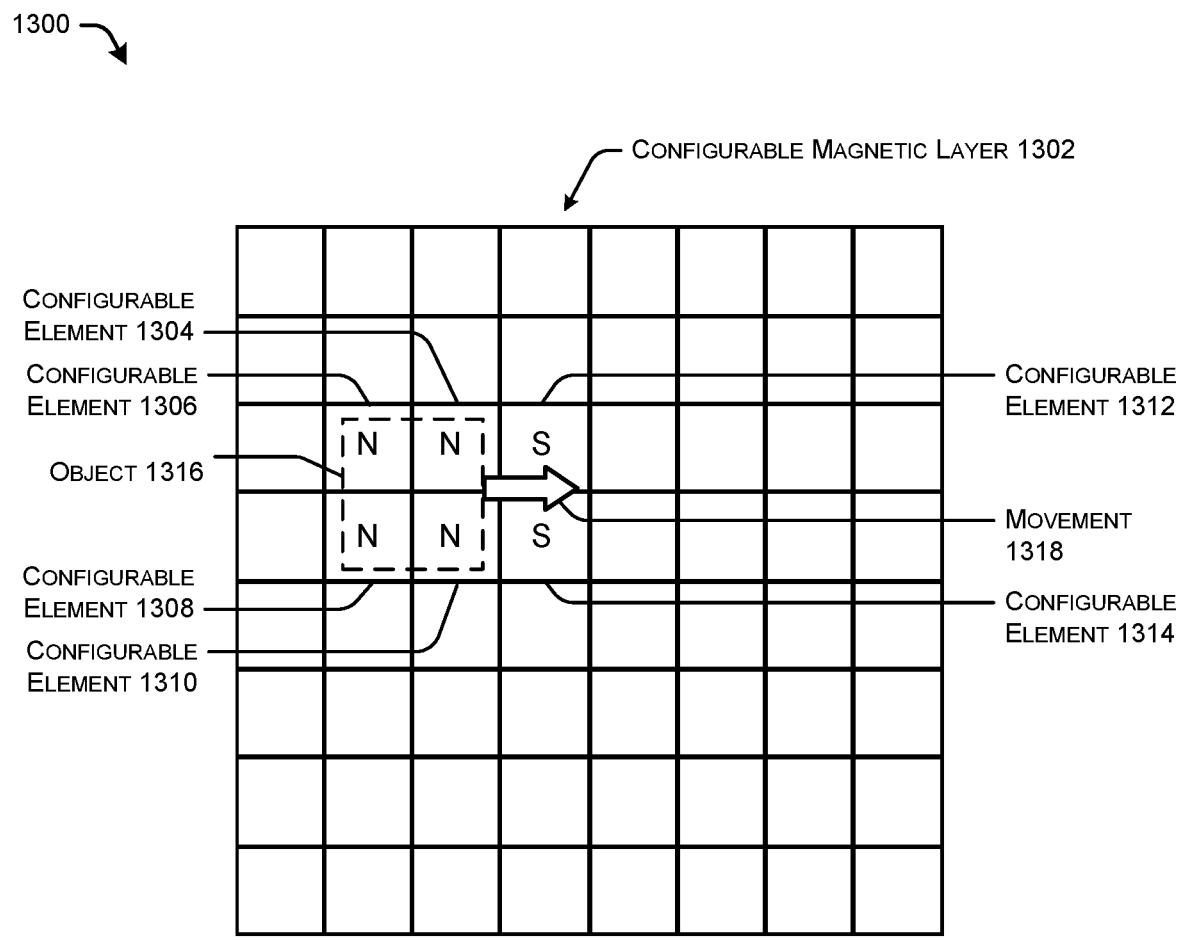
FIG. 13 illustrates an example of a configurable magnetic layer of the smart mat configured to move an object, in accordance with embodiments of the disclosure.

FIG. 13 illustrates a plan view 1300 example of a configurable magnetic layer 1302 of the smart mat to move an object, in accordance with embodiments of the disclosure. As illustrated, the configurable magnetic layer 1302 is represented as a grid of elements, including configurable elements 1304, 1306, 1308, 1310, 1312, and 1314. In some instances, a configurable element of the configurable elements 1304, 1306, 1308, 1310, 1312, and 1314 can correspond to one of the coils 1202, 1204, 1206, and 1208 of FIG. 12. That is, the configurable elements 1304, 1306, 1308, 1310, 1312, and 1314 can be selectively controlled to output a magnetic field (e.g., in any direction) or can remain in a neutral state. In some instances, grids that are illustrated without an "N" or "S" can correspond to an inactive configurable element, for example, in a neutral state.

In some instances, an object 1316 can be placed on a surface of a smart mat. Further, the object 1316 can be associated with a magnetic field. For example, the object 1316 can correspond to the smart block 300, and accordingly, a bottom face of the object 1316 can be configured to output a particular magnetic field. In other examples, the object 1316 can correspond to a simplified block (e.g., a wooden or plastic block without electronics), for example, with a magnet disposed in the base of the block. In this example, a bottom face of the object 1316 can be configured to output a "North" magnetic field.

Accordingly, when the configurable elements 1304, 1306, 1308, and 1310 are configured to a "North" state (represented by "N"), the configurable elements 1304, 1306, 1308, and 1310 will repel the object 1316. Further, the configurable elements 1312 and 1314 can be configured to a "South" state (represented by "S"), and accordingly, the configurable elements 1312 and 1314 can attract the object 1316. In response to the push and pull provided by the configurable elements 1304, 1306, 1308, 1310, 1312, and 1314 relative to the object 1316, the object 1316 can be moved relative to the configurable magnetic layer 1302, represented by a movement 1318. In some instances, the configurable elements can be controlled to rotate, flip, roll, or provide other movements to the object 1316.

As the object 1316 moves across the configurable magnetic layer 1302, additional elements of the configurable magnetic layer 1302 can be activated to output a magnetic field to push or pull the object 1316 in an intended direction. For example, the smart mat can receive a command indicating an identity of an element (e.g., an address of the element), a direction (e.g., polarity) and/or magnitude of current, and a duration to apply the current.

In some instances, the magnetic fields of the configurable magnetic layer 1302 and the smart block 300 can be coordinated to cause any motion of the smart block 300 relative to the configurable magnetic layer 1302.

FIG. 14 illustrates an example flow diagram of a process 1400 for facilitating interactions between a remote computing device and a surface of a smart mat, in accordance with embodiments of the disclosure. For example, aspects of the process 1400 can be performed by the smart mats 248, 252, and 902, as illustrated in FIGS. 2B and 9.

At 1402, the operation can include receiving an indication of a remote interaction associated with a surface of a remote computing device. In some instances, the surface of the remote computing device can correspond to a remote smart mat (e.g., such as the smart mat 248, relative to the smart mat 252) or a remote computing device (e.g., such as the computing devices 130 or 214), and in some instances, the indication can be received at a smart mat (e.g., such as the smart mats 112, 248, 252, and 902). In some instances, the interaction can include a touch input, selection of a location of the surface of the remote computing device, selection of an image or audio to present, and the like. In some instances, the interaction can include moving an object on the surface of the remote computing device from a first location to a second location.

At 1404, the operation can include determining an action associated with the indication. In some instances, the indication can correspond to an action to present a visual indication (e.g., via a display of a local computing device). In other instances, the indication can include an instruction that a smart block or object located on the surface of the local computing device is to be moved from a first location to a second location. Thus, in this example, the operation 1404 can include determining that the action associated with the indication corresponds to a particular smart block being moved to a particular location.

At 1406, the operation can include providing an output (e.g., audio, visual, or haptic) at a local computing device based at least in part on the indication. For example, the operation 1406 can include displaying lights and/or an image on a location of the smart mat (e.g., the local computing device), whereby a location of the output with respect to the local computing device can correspond to a location with respect to the surface of the remote computing device. For example, a touch input on a location of the surface of the remote computing device can cause an output at a corresponding location of the local computing device. In some instances, where an object is to be moved on the local computing device, the operation 1406 can include providing an output identifying the object to be moved, a starting location of the object, an ending location of the object, a path of the object on the local computing device, and the like. In some instances, the operation 1406 can include providing haptic feedback to vibrate a particular object or smart block on the smart mat, and in some instances, the operation 1406 can include vibrating some or all of the smart mat. Further, the operation 1406 can include generating audio at the smart mat.

At 1408, the operation can include determining a location of at least one object located on the local computing device. In some instances, the operation 1408 can include determining a starting location of an object, an ending location of the object, a path for the object on the surface of the local computing device, and the like. In some instances, the operation 1408 can further include querying objects on the surface of the local computing device to identify such objects and to determine locations of the objects. In some instances, the operation 1408 can include determining capabilities of the objects, for example, whether the objects can output audio, video, haptic feedback, and like, or whether the objects include configurable magnet components.

At 1410, the operation can include determining that the at least one object has complete the action associate with the indication. For example, the indication discussed above can correspond to any number of instructions, including but not limited to: moving the at least one object; picking up the at least one object; touching the at least one object; touching a portion of the local computing device; and the like. Accordingly, the operation 1410 can include determining that the action has been completed. This operation 1410 can include determining identities of smart blocks and/or objects on the local computing device; determining touch inputs, audio inputs, etc., of the local computing device; and the like.

Figure 15:
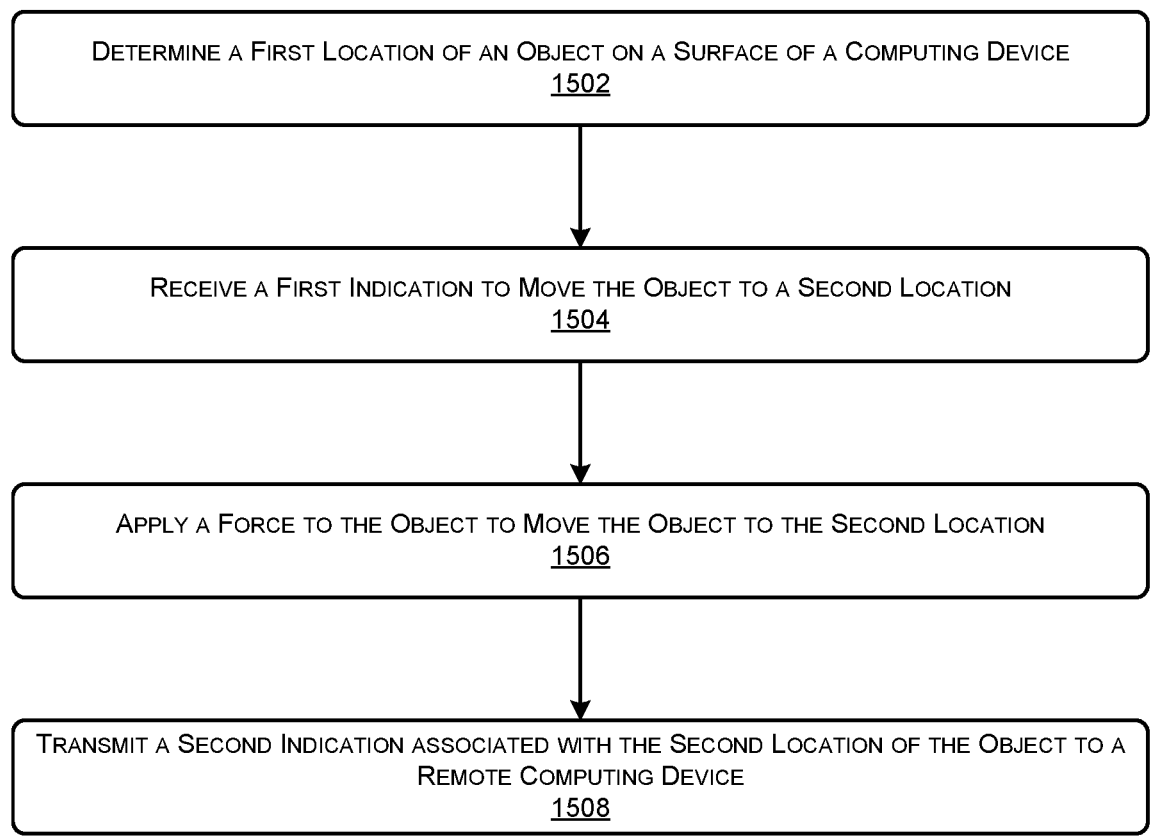
FIG. 15 illustrates an example flow diagram of a process for moving an object disposed on a surface of a smart mat, in accordance with embodiments of the disclosure.

At 1412, the operation can include transmitting the location associated with the at least one object to the remote computing device. For example, the operation 1412 can include transmitting the ending location of the at least one object following a movement of the at least one object, either by the smart mat (discussed herein) or by a user, at least partially in response to the indication received from the remote computing device. In some instances, the location associated with the at least one object can be provided to the remote computing device to update a user interface, for example, it FIG. 15 illustrates an example flow diagram of a process 1500 for moving an object disposed on a surface of a smart mat, in accordance with embodiments of the disclosure. For example, aspects of the process 1500 can be performed by the smart mats 248, 252, and 902, as illustrated in FIGS. 2B and 9.

At 1502, the operation can include determining a location of an object on a surface of a computing device. For example, the operation can include determining a location of a smart block located on a smart mat. In some instances, the operation 1502 can include the localization techniques discussed herein, such as receiving wireless signals associated with smart blocks to triangulate locations and/or orientations of the various smart blocks. Further, the operation can include receiving image data to visually determine locations of the smart blocks on the smart mat. In some instances, the operation can include receiving audio corresponding to individual smart blocks or individual faces of a smart block to determine an identity and/or location of the objects. In some instances, the operation can include activating at least a portion of the configurable magnetic layer, which in turn can be interpreted by individual smart blocks as a request for identity information. Accordingly, the smart blocks can activate at least one configurable magnet to identify the smart block based at least in part on magnetic fields. As can be understood, any number of techniques can be used to determine a first location of the object on the surface of the computing device, as discussed herein.

At 1504, the operation can include receiving a first indication to move the object to a second location. In some instances, the first indication can correspond to movement of a corresponding object on a remote smart mat from a corresponding first location to a corresponding second location. In some instances, the first indication can correspond to movement of a corresponding virtual object on a remote user interface from a corresponding first location to a corresponding second location.

At 1506, the operation can include applying a force to the object to move the object to the second location. As discussed herein, the computing device (e.g., a smart mat) can include a configurable magnetic layer, and in some instances, the object (e.g., the smart block) can include one or more configurable magnet components. The computing device can configure the configurable magnetic layer to attract and/or repel the configurable magnet components of the object to move the object from the first location to the second location, as discussed herein. In some instances, the force can be provided by puffs of air; an external robotic arm; a robotic arm internal to the computing device configured to selectively generate a magnetic field under the object to attract or repel the object to move the object to the second location; and the like.

At 1508, the operation can include transmitting a second indication associated with the second location of the object to a remote computing device. For example, the second indication can be utilized by remote computing device to update a location of a corresponding object such that a state of objects presented in connection with the remote computing device substantially corresponds to or mirrors a configuration of objects on the surface of the computing device, thereby facilitating joy, interactivity, and fun.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A first computing device comprising:
 a plurality of elements including at least:
  a configurable electromagnetic element having a plurality of configurable elements configurable to selectively generate a magnetic field;
  a display; and
  a cushion;
 one or more processors; and
 one or more computer-readable media storing computer-executable instructions that, when executed by the one or more processors, cause the one or more processors to:

identify a first object on a surface of the first computing device based at least in part on a marking associated with the first object, the surface representing a top surface of the plurality of elements;
determine a first location of the first object on the surface;
receive, from a second computing device remote from the first computing device, first data indicative of a movement of a second object from a second location to a third location;
determine a fourth location on the top surface of the first computing device that corresponds to the third location;
determine a first magnetic field associated with the first object;
apply an electrical current to a configurable element of the plurality of configurable elements to generate a second magnetic field at the top surface of the first computing device, the second magnetic field configured to apply a force to the first object at the first location in a direction of the fourth location, the force based at least in part on the first magnetic field and the second magnetic field;
determine that the first object is within a threshold distance of the fourth location on the top surface of the first computing device based at least in part on the marking; and
send, to the second computing device, second data associated with the first object being within the threshold distance of the fourth location on the top surface of the first computing device.

2. The first computing device of claim 1, wherein the computer-executable instructions, when further executed by the one or more processors, further cause the one or more processors to:
receive the first data indicative of the movement based on an input associated with the second object, wherein the second object is a virtual object;
determine one or more configurable elements of the first computing device corresponding to one or more locations associated with the movement; and
cause one or more electrical current in the one or more configurable elements to move the first object from the first location to the fourth location on the top surface.

3. The first computing device of claim 1, wherein the configurable element includes at least one spiral coil configured to generate the second magnetic field at a first time and to detect a third magnetic field at a third time, the third magnetic field associated with an identity of the first object.

4. The first computing device of claim 1, wherein the computer-executable instructions, when further executed by the one or more processors, further cause the one or more processors to:
determine the threshold distance based at least in part on a magnetic identifier associated with the first object.

5. The first computing device of claim 1, further comprising:
at least one haptic component configured to randomize locations of objects on the top surface upon receiving third data indicative of randomizing the locations from the second computing device.

6. A first computing device comprising:
at least one configurable element configurable to selectively generate an electromagnetic field at a top surface of the first computing device;
one or more processors; and
one or more computer-readable media storing computer-executable instructions that, when executed by the one or more processors, cause the one or more processors to:
identify an object on the top surface of the first computing device based at least in part on a marking associated with the object,
determine that the object is at first location on the top surface of the first computing device;
receive, from a second computing device that is remote from the first computing device, a command to cause the object to move to a second location on the top surface;
determine a magnetic state associated with the object;
cause the at least one configurable element to generate the electromagnetic field to move the object in a direction of the second location;
determine that the object is within a threshold distance of the second location on the top surface of the first computing device based at least in part on the marking; and
send, to the second computing device, data associated with the object being within the threshold distance of the second location on the top surface of the first computing device.

7. The first computing device of claim 6, wherein the computer-executable instructions, when further executed by the one or more processors, further cause the one or more processors to:
cause content to be outputted by at least one display based at least in part on the object being within the threshold distance of the second location on the top surface of the first computing device.

8. The first computing device of claim 6, wherein the at least one configurable element includes a flat spiral coil configured to generate the electromagnetic field based at least in part on an electrical current being associated with the flat spiral coil.

9. The first computing device of claim 6, wherein the computer-executable instructions, when further executed by the one or more processors, further cause the one or more processors to:
determine an address of the at least one configurable element, the address corresponding to a third location on the top surface; and
cause the at least one configurable element to generate the electromagnetic field to attract the object based at least in part on the third location being between the first location and the second location.

10. The first computing device of claim 6, wherein the computer-executable instructions, when further executed by the one or more processors, further cause the one or more processors to:
determine an address of the at least one configurable element, the address corresponding to a third location on the top surface; and
configure the at least one configurable element to generate the electromagnetic field to repel the object based at least in part on first location being between the second location and the third location.

11. The first computing device of claim 6, further comprising:
causing the at least one configurable element to generate an alternating magnetic field to inductively charge the object.

12. The first computing device of claim 6, further comprising:

a plurality of speakers; and wherein the computer-executable instructions, when further executed by the one or more processors, further cause the one or more processors to:

select a speaker of the plurality of speakers; and output audio via the speaker.

13. The first computing device of claim 6, further comprising:

at least one haptic component; and wherein the computer-executable instructions, when further executed by the one or more processors, further cause the one or more processors to:

receive data to randomize locations of one or more objects on the top surface; and activate the at least one haptic component to randomize the locations of the one or more object on the top surface.

14. A method comprising:

identifying an object on a top surface of a first computing device based at least in part on a marking associated with the object, wherein the first computing device includes at least one configurable element to selectively generate a magnetic field at the top surface of the first computing device;

determining that the object is at a first location on the top surface of the first computing device;

receiving, from a second computing device that is remote from the first computing device, a command to cause the object to move to a second location on the top surface; determining a magnetic state associated with the object;

causing the at least one configurable element to generate the magnetic field to move the object in a direction of the second location;

determining that the object is within a threshold distance of the second location on the top surface based at least in part on the marking; and transmitting, to the second computing device, data indicative of the object being within the threshold distance of the second location on the top surface of the first computing device.

15. The method of claim 14, wherein the at least one configurable element includes a flat spiral coil, the method further comprising:

applying an electrical current to the flat spiral coil to generate the magnetic field.

16. The method of claim 14, further comprising:

determining an address of the at least one configurable element corresponding to a third location on the top surface; and causing the at least one configurable element to generate the magnetic field to attract the object based at least in part on the third location being between the first location and the second location.

17. The method of claim 14, further comprising:

receiving data to randomize locations of one or more objects on the top surface; and activating at least one haptic component of the first computing device to randomize the locations of the one or more object on the top surface.

18. The method of claim 14, further comprising:

activating at least one haptic component of the computing device to at least partially move the object towards the second location.

19. The first computing device of claim 6, wherein the computer-executable instructions, when further executed by the one or more processors, further cause the one or more processors to:

determine the threshold distance based at least in part on a magnetic identifier associated with the object.

20. The method of claim 14, further comprising:

determining the threshold distance based at least in part on a magnetic identifier associated with the object.

* * * * *